United States Patent
Rains et al.

(10) Patent No.: US 12,382,857 B2
(45) Date of Patent: Aug. 12, 2025

(54) AGRICULTURAL EQUIPMENT WITH ACOUSTIC/VIBRATION SENSOR AND SIGNAL PROCESSING SYSTEM

(71) Applicant: Deere & Company, Moline, IL (US)

(72) Inventors: Gerald Eric Rains, Eldridge, IA (US); Scott C. McCartney, Bettendorf, IA (US); Cary S. Hubner, Geneseo, IL (US); Houstin Lee Lichtenwalner, Jr., Emmaus, PA (US); Bran Ferren, Los Angeles, CA (US)

(73) Assignee: DEERE & COMPANY, Moline, IL (US)

(*) Notice: Subject to any disclaimer, the term of this patent is extended or adjusted under 35 U.S.C. 154(b) by 326 days.

(21) Appl. No.: 18/171,562

(22) Filed: Feb. 20, 2023

(65) Prior Publication Data

US 2024/0276906 A1    Aug. 22, 2024

(51) Int. Cl.
    *A01C 14/00*    (2006.01)
    *A01C 7/20*    (2006.01)

(52) U.S. Cl.
    CPC ............... *A01C 14/00* (2013.01); *A01C 7/20* (2013.01)

(58) Field of Classification Search
    CPC ........... A01C 14/00; A01C 7/20; A01C 7/105; A01C 5/062; A01B 76/00
    See application file for complete search history.

(56) References Cited

U.S. PATENT DOCUMENTS

| | | | |
|---|---|---|---|
| 9,702,753 B2 | 7/2017 | Johnson et al. | |
| 9,779,330 B2 | 10/2017 | Wellington et al. | |
| 9,826,683 B2 | 11/2017 | Burns et al. | |
| 9,832,928 B2 | 12/2017 | Dybro et al. | |
| 9,964,484 B2 | 5/2018 | Haiges et al. | |
| 10,989,833 B2 | 4/2021 | Ferren et al. | |
| 2012/0227647 A1 | 9/2012 | Gelinske et al. | |
| 2019/0141880 A1* | 5/2019 | Zemenchik | A01C 5/064 172/1 |
| 2019/0174667 A1* | 6/2019 | Gresch | A01B 61/044 |
| 2020/0132654 A1 | 4/2020 | Pomedli | |

(Continued)

FOREIGN PATENT DOCUMENTS

| | | | | |
|---|---|---|---|---|
| CN | 114264457 A | * | 4/2022 | G01N 3/56 |
| EP | 2966966 A1 | | 1/2016 | |

(Continued)

OTHER PUBLICATIONS

Extended European Search Report and Written Opinion issued in European Patent Application No. 24155768.5 dated Jul. 8, 2024, in 13 pages.

(Continued)

*Primary Examiner* — Francis C Gray

(74) *Attorney, Agent, or Firm* — Christopher J. Volkmann; KELLY, HOLT & CHRISTENSON, P.L.L.C

(57) ABSTRACT

An acoustic or vibration sensor is disposed relative to a portion of an agricultural machine. A sensor signal generated by the acoustic or vibration sensor is provided to a signal processor that identifies acoustic signatures or vibration patterns to determine a machine operation characteristic responsive to the agricultural machine performing an operation. The machine operation characteristic can be a characteristic of the agricultural machine, the soil, and/or furrow opened by the agricultural machine.

19 Claims, 14 Drawing Sheets

(56) References Cited

U.S. PATENT DOCUMENTS

2020/0236843 A1* 7/2020 Graham ................ A01C 5/064
2020/0404831 A1  12/2020 Kowalchuk et al.
2022/0304212 A1* 9/2022 Glovier ............... A01B 61/042
2022/0391644 A1  12/2022 Honkanen

FOREIGN PATENT DOCUMENTS

WO   WO 2014/197973 A1   12/2014
WO   WO 2019/157521 A1    8/2019

OTHER PUBLICATIONS

Extended European Search Report and Written Opinion issued in European Patent Application No. 24155772.7 dated Jul. 8, 2024, in 09 pages.

* cited by examiner

AGRICULTURAL EQUIPMENT WITH ACOUSTIC/VIBRATION SENSOR AND SIGNAL PROCESSING SYSTEM

FIELD OF THE DESCRIPTION

The present description relates to agricultural equipment. More specifically, the present description relates to a system that detects and processes acoustic or vibration signals on an agricultural machine.

BACKGROUND

There are a wide variety of different types of agricultural equipment that can be used to plant seeds or apply other commodities to a field. Such equipment can include air seeders. Air seeders have an air cart with one or more central seed or commodity tanks. The seed or commodity in the tank is metered by a metering system into common product delivery tubes called "primaries". The seed or commodity is delivered (using air delivery) to a tool for disbursement. The tool disburses the product into secondary tubes which deliver the product to individual furrows opened by the tool. The furrows are opened by a furrow opener and closed after seed is delivered to the furrow by a closer. Other agricultural equipment can include planters that have row units.

The discussion above is merely provided for general background information and is not intended to be used as an aid in determining the scope of the claimed subject matter.

SUMMARY

An acoustic or vibration sensor is disposed relative to a portion of an agricultural machine. A sensor signal generated by the acoustic or vibration sensor is provided to a signal processor that identifies acoustic signatures or vibration patterns to determine a machine operation characteristic responsive to the agricultural machine performing an operation. The machine operation characteristic can be a characteristic of the agricultural machine, the soil, and/or furrow opened by the agricultural machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1A:
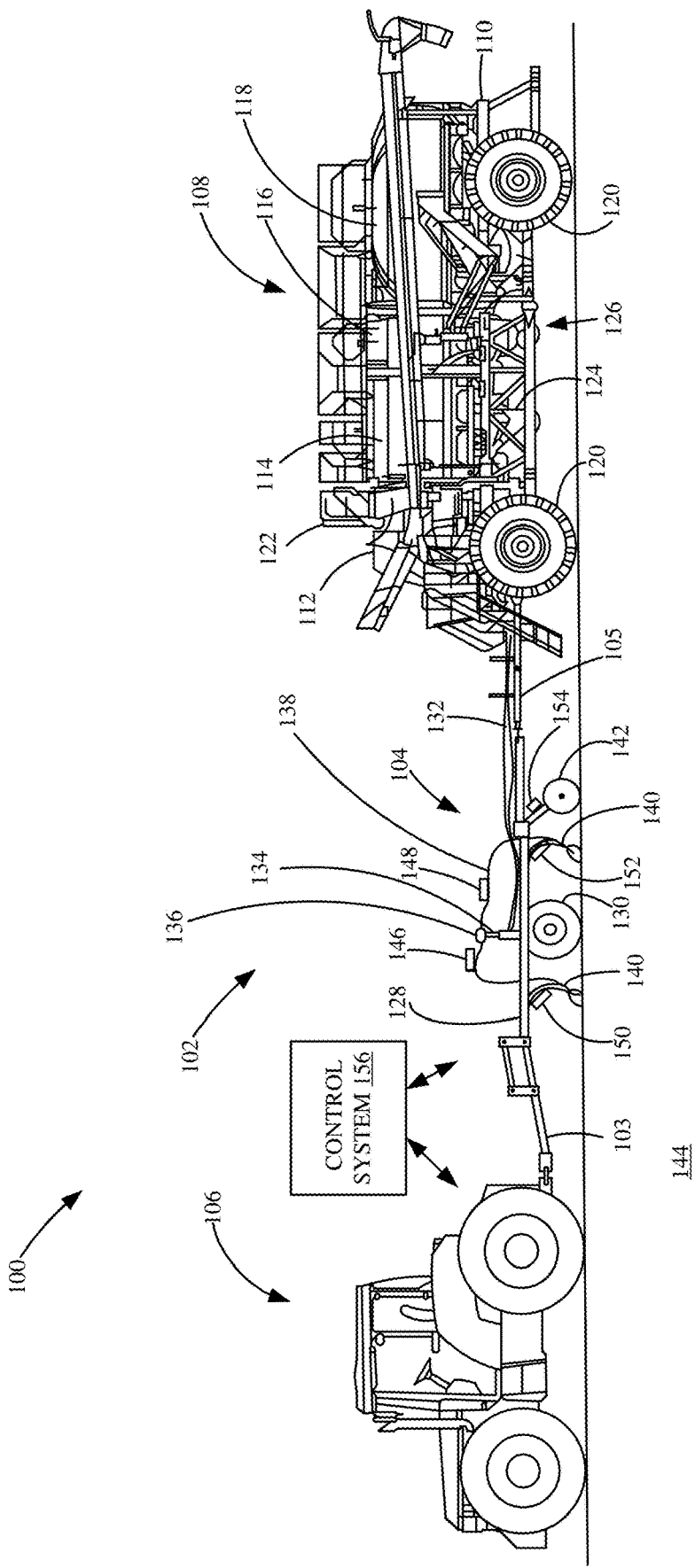
FIG. 1A is a partial pictorial, partial block diagram illustrating an agricultural system in which an air seeder is towed by a tractor.

As discussed above, air seeders have an air cart with one or more tanks that hold material to be delivered to the field. The air cart also has a metering system corresponding to each tank. The metering system meters material from the corresponding tank into a primary delivery tube that, and a fan blows air through that tube in order to move the material through the primary delivery tube to a seeding tool. The seeding tool receives material from the primary delivery tube and disperses it into a plurality of secondary delivery tubes. Each secondary delivery tube delivers material to a particular furrow that is opened by a furrow opener on the tool. After the material is placed in the furrow, the furrow can be closed by a furrow closer on the tool.

Blockages can occur both upstream of the metering system, (e.g., in the tank), and downstream of the metering system, (e.g., in the primary or secondary delivery tubes). Therefore, some current systems include a blockage sensor on the secondary tubes on the air tool in order to determine whether any material is passing through that secondary delivery tube. If material is not detected by the blockage sensor, then the blockage sensor generates a signal indicative of a blockage somewhere upstream of the blockage sensor.

However, when the air cart has multiple tanks, those tanks can be configured to meter multiple different materials through a single primary delivery tube. Those multiple materials are simultaneously delivered by the primary delivery tube to the secondary delivery tubes. Therefore, the blockage sensors in the secondary tubes cannot indicate when a blockage occurs with respect to one material metered from one of the tanks, but not the other material. Instead, with current sensors, as long as any material is sensed by the blockage sensor, the sensor signal will not indicate a blockage. Similarly, the current blockage sensors cannot indicate whether the materials are being delivered through the primary and secondary delivery tubes in the correct ratio relative to one another. Current sensors only detect whether material is flowing through the secondary tubes.

In addition, air seeders can encounter other problematic situations as well. For instance, after a furrow is opened, there may still be a large amount of residue or other debris in the furrow. Also, if the soil is muddy, the furrow opener or the furrow closer (which are often rotating discs) can become stuck so that they are no longer rotating, but are instead simply being dragged through the mud.

It can thus be seen that there are a wide variety of different types of blockage characteristics, furrow/soil characteristics, or machine characteristics, that can present problems.

The present description thus proceeds with respect to a system that includes one of more acoustic or vibration sensors that sense sounds or vibrations and generate a sensor signal indicative of those sounds or vibrations. An advanced data processing system, such as Fast Fourier Transforms (FFTs) and windowing or level crossing thresholds, an artificial intelligence signal processor (e.g., a convolutional neural network) or other machine learning processor is used to generate an output, based upon the acoustic or vibration sensor signals indicative of one of a plurality of different characteristics. For instance, in one example the artificial neural network can identify acoustic signatures of the different types of material traveling through the secondary delivery tube to identify whether, and how much of, each different type of material is traveling through that tube. This can be used to determine whether a blockage exists, or whether a partial blockage exists and, if so, which meter or tank contains the blockage or partial blockage. Similarly, the acoustic or vibration sensors can be mounted to the tool to detect furrow or soil characteristics. By way of example, when the furrow opener or furrow closer engages different materials on the field surface or in the soil, those different materials will generate a different acoustic pattern or signature. Normal soil, for instance, may generate one acoustic signature, while soil that has a relatively large amount of residue (e.g., from a previous planting season) may generate a different acoustic signal as the tool engages that soil. Further, the acoustic or vibration sensors can be used to sense sounds or vibrations that may indicate machine characteristics. By way of example, if a furrow closer is a disc closer that normally rotates to push dirt back over the furrow, then the sound that the bearings make (as the disc is rotating) will generate one type of acoustic pattern or signature. However, if the soil is muddy so that the disc closer is no longer rotating, then the acoustic pattern or signature corresponding to the bearings will no longer be present. Thus, the artificial intelligence signal processor can process the acoustic or vibration signals to generate outputs indicative of blockage characteristics, furrow/soil characteristic, and/or machine characteristics.

The present description will proceed with respect to a material application tool being an air seeder that has an air cart and a seeding tool. The air cart has a plurality of tanks, each with a corresponding meter. The air cart also has a delivery system that delivers metered material to different work points on a seeding tool where furrows are opened by openers on the seeding tool and closed by closers. The present description also proceeds with respect to a planter and/or row unit. It will be noted that the material application tool can be an implement that seeds and applies fertilizer or that applies other material as well.

FIG. 1A is a side view of an example of an agricultural system 100 which includes an agricultural implement, in particular an air or pneumatic seeder 102. In the example shown in FIG. 1A, the seeder 102 comprises a tilling implement (or seeding tool) 104 (also sometimes called a drill) towed between a tractor (or other towing vehicle) 106 and a commodity cart (also sometimes called an air cart) 108. The commodity cart 108 has a frame 110 upon which a series of product tanks 112, 114, 116, and 118, and wheels 120 are mounted. Each product tank has a door (a representative door 122 is labeled) releasably sealing an opening at the upper end of the tank for filling the tank with product, most usually seed or a commodity of one type or another. A metering system 124 is provided at a lower end of each tank (a representative one of which is labeled in FIG. 1A and others are shown below) for controlled feeding or draining of product (most typically granular material) into a pneumatic distribution system 126. The tanks 112, 114, 116, and 118 can hold, for example, a material or commodity such as seed or fertilizer to be distributed to the soil. The tanks can be hoppers, bins, boxes, containers, etc. The term "tank" shall be broadly construed herein. Furthermore, one tank with multiple compartments can also be provided instead of separate tanks.

The tilling implement 104 includes a frame 128 supported by ground engaging wheels 130. Frame 128 is connected to a leading portion of the commodity cart 108, for example by a tongue style attachment (not labeled). The commodity cart 108 as shown is sometimes called a "tow behind cart," meaning that the cart 108 follows the tilling implement 104. In an alternative arrangement, the cart 108 can be configured as a "tow between cart," meaning the cart 108 is between the tractor 106 and tilling implement 104. In yet a further possible arrangement, the commodity cart 108 and tilling implement 104 can be combined to form a unified rather than separated configuration. These are just examples of additional possible configurations. Other configurations are even possible and all configurations should be considered contemplated and within the scope of the present description.

In the example shown in FIG. 1A, tractor 106 is coupled by couplings 103 to seeding tool 104 which is coupled by couplings 105 to commodity cart 108. The couplings 103 and 105 can be mechanical, hydraulic, pneumatic, and electrical couplings and/or other couplings. The couplings 103 and 105 can include wired and wireless couplings as well.

The pneumatic distribution system 126 includes one or more fans located generally at 121 connected to a product delivery conduit structure having multiple product flow passages 132 referred to as primary delivery tubes 132. The fan directs air through the primary delivery tubes 132. Each product metering system 124 controls delivery of product from its associated tank at a controllable rate to the transporting airstreams moving through primary delivery tubes 132. In this manner, each flow passage defined by each primary delivery tube 132 carries product from one or more of the tanks to a secondary distribution tower 134 on the tilling implement 104. Typically, there will be one tower 134 for each primary delivery tube 132. Each tower 134 includes a secondary distributing manifold 136, typically located at the top of a vertical tube. The secondary distributing manifold 136 divides the flow of product into a number of secondary distribution tubes 138. Each secondary distribution tube 138 delivers product to one of a plurality of ground engaging tools 140 (also known as ground openers) that define the locations of work points on tilling implement 104. The ground engaging tools (or furrow openers) 140 open a furrow in the soil 144 and facilitate deposit of the product therein. The number of primary delivery tubes 132 that feed into secondary distribution may vary from one to eight or ten or more, depending at least upon the configuration of the commodity cart 108 and tilling implement 104. Depending upon the cart and implement, there may be two distribution manifolds 136 in the air stream between the meters 124 and the ground engaging tools 140. Alternatively, in some configurations, the product is metered directly from the tank or tanks into secondary distribution lines that lead to the ground engaging tools 140 without any need for an intermediate distribution manifold. The product metering system 124 can be configured to vary the rate of delivery of seed or other material to each work point on tilling implement 104 or to different sets or zones of work points on tilling implement 104. The configurations described herein are only examples. Other configurations are possible and should be considered contemplated and within the scope of the present description.

A firming or closing wheel 142 associated with each ground engaging tool 140 trails the tool and firms the soil over the product deposited in the soil. In practice, a variety of types of tools 140 are used including, but not necessarily limited to, tines, shanks and disks. The tools 140 are typically moveable between a lowered position engaging the ground and a raised position riding above the ground. Each individual tool 140 may be configured to be raised by a separate actuator. Alternatively, multiple tools 140 may be mounted to a common component for movement together. In yet another alternative, the tools 140 may be fixed to the frame 128, the frame being configured to be raised and lowered with the tools 140.

Examples of air or pneumatic seeder 102 described above should not be considered limiting. The features described in the present description can be applied to any seeder configuration, or other material application machine, whether specifically described herein or not.

FIG. 1A also shows that agricultural system 100 includes one or more acoustic or vibration sensors (referred to herein as acoustic/vibration sensors). In the example in FIG. 1A, the acoustic/vibration sensors are labelled 146, 148, 150, 152, and 154. Acoustic/vibration sensors 146, 148, 150, 152, and 154 (also referred to herein as acoustic/vibration sensors 146-154 or sensors 146-154) are configured to sense an acoustic parameter responsive to a sound and/or a vibration parameter responsive to a vibration. Acoustic/vibration sensors 146 and 148 are disposed within different secondary distribution tubes 138. Acoustic/vibration sensors 150 and 152 are on the mounting structure for tools 140, and acoustic/vibration sensor 154 is on the mounting structure for closing wheel 142. It will be appreciated that there can be more or fewer acoustic/vibration sensors and those shown in FIG. 1A are shown for the sake of example only. FIG. 1A shows that agricultural system 100 can also include control system 156. Control system 156 receives and processes signals from the acoustic/vibration sensors 146, 148, 150, 152, and 154 and generates an output based on the processed signals. Control system 156 is described in greater detail elsewhere herein.

Also, it will be appreciated, that different portions of system 156 can reside on tractor 106, on tool or implement 104, and/or on air cart 108, or all of the elements of system 156 can be located at one place (e.g., on tractor 106). Elements of system 156 can be distributed to a remote server architecture or located or distributed in other ways as well.

By way of example, acoustic/vibration sensors 146 and 148 can generate acoustic signals indicative of the acoustic pattern or signature or indicative of the vibration pattern or signature of material traveling through the secondary distribution lines 138, to which sensors 146 and 148 are mounted. In one example, the acoustic signature or vibration signature of the material will be different depending on the quantity of material and the type of material traveling through the secondary distribution line. Therefore, control system 156 can use machine learning (e.g., artificial intelligence, an artificial neural network, a convolutional neural network, etc.) to process the sensor signals generated by sensors 146 and 148 and identify the quantity and types of material traveling through the secondary distribution lines 138 based on the acoustic pattern or signature or vibration pattern or signature. As used herein, acoustic signature and acoustic pattern will be used interchangeably as will vibration signature and vibration pattern. Also, acoustic/vibration signature or pattern includes, without limitation, acoustic signature, acoustic pattern, vibration signature, and/or vibration pattern.

Assume, for instance, that one of the secondary distribution lines 138 receives material from two different tanks 114 and 116, that are both metered into a single primary distribution tube 132. In that case, there may be a blockage in either or both of the tanks 116 and 118, or the blockage could be at the metering devices 124 corresponding to the different tanks 116 and 118, or below those metering devices. Therefore, there may be a full or partial blockage of material flow from one or both of the tanks 116 and 118. By processing the acoustic signatures generated by sensors 146 and 148, control system 156 can determine what types of material are flowing through the corresponding secondary distribution tubes 138, and the quantity of each material and/or the ratio of the multiple different materials traveling through the same secondary distribution line 138 relative to one another. In this way, if one tank has a blockage but the other tank does not, then even if a secondary distribution line 138 is carrying a single material, the control system 156 can identify that flow of the other material is blocked, which tank is blocked, whether it is a partial or complete blockage, and/or which meter is blocked. The control system 156 can process the acoustic signal or vibration signal to identify any characteristics of the material to be delivered (e.g., to identify materials being delivered, whether a material is blocked, quantities or ratios of materials being delivered, or other parameter or characteristic that is responsive to delivery of material by the delivery system, etc.) that can be identified by the acoustic signature or pattern and/or the vibration signature or pattern. This information can be used to generate an output to the operator, or for a variety of other uses, some of which are described in greater detail elsewhere herein. Also, while the present discussion proceeds with respect to, in one example, having two different tanks that deliver two different materials to a single primary distribution tube 132, it will be appreciated that any number N of tanks can be deliver N different materials to a single primary delivery tube 132. Other configurations are also contemplated herein.

Sensors 150 and 152 may be acoustic or vibration sensors mounted to sense the acoustic or vibration pattern generated by the corresponding tool 140 to which they are mounted. The acoustic pattern or the vibration pattern may differ depending upon the characteristics of the soil or furrow being engaged by the tools 140. For instance, assume that a tool 140 is encountering soil that is relatively clear of residue from a prior growing season. The acoustic signature or vibration pattern generated by the corresponding sensor 150 or 152 may be a first signature or pattern. However, if the tool 140 is traveling through soil that has a relatively heavy concentration of residue from a prior growing season, then the acoustic signature or vibration pattern sensed by the corresponding sensor 150 or 152 will be a different signature or pattern. Further, if the tool 140 engages a rock or other obstacle, that will also be indicated by the acoustic signature or vibration pattern generated by the corresponding sensor. Also, where the soil is of one type (e.g., sandy) then the acoustic signature or vibration pattern may differ from the acoustic signature or vibration pattern where the soil is clay. Therefore, control system 156 can process the acoustic signal or vibration signal to identify any characteristics of the furrow or soil (e.g., clean soil, soil with residue, soil with rocks or other objects, soil type, soil moisture, etc.) that can be identified by the acoustic signature or vibration pattern.

Sensor 154 may also be an acoustic sensor which generates a signal indicative of the acoustic pattern or signature or the vibration pattern or signature generated by a part of the machine, such as closing wheel 142. Control system 156 can generate an output indicative of machine characteristics corresponding to the part of the machine, such as closing wheel 142 based upon the acoustic signature or pattern. For instance, if wheel 142 is rotating, then the bearings in wheel 142 will influence the acoustic signature or vibration pattern sensed by sensor 154. However, if the soil is muddy so that wheel 142 is no longer rotating but is instead being dragged through the muddy soil, then the vibration pattern or acoustic signature will be different, because there will be no bearing noise or vibration. Also, bearings or other moving parts may generate different acoustic signatures or vibration patterns as they wear. Further, if the tool is supposed to be in engagement with the ground, but the acoustic signature or vibration pattern is consistent with the tool being out of engagement with the ground, this can be indicative of a tool malfunction. Any type of machine characteristic that produces an acoustic signature or vibration pattern can be sensed. Therefore, control system 156 can identify machine characteristics based upon the acoustic signature or vibration pattern generated by sensor 154. It will be appreciated that there are a wide variety of different types of blockage characteristics or other material flow characteristics, furrow/soil characteristics, and/or machine characteristics that can be identified based upon the outputs from the acoustic/vibration sensors, and those described herein are described for the sake of example only.

Figure 1B:
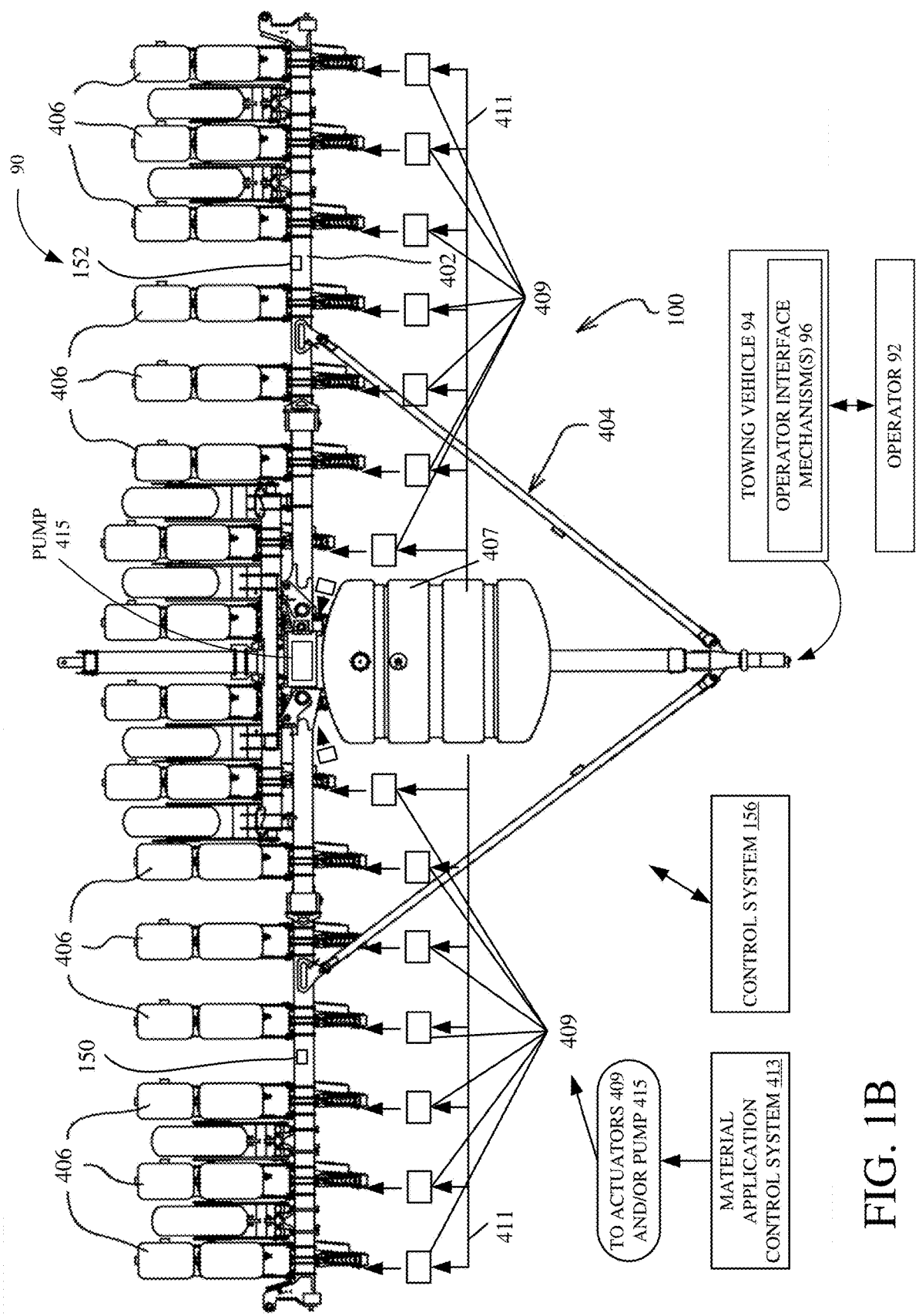
FIG. 1B is a top view of one example of a planting machine, shown in partial pictorial, partial schematic form.

The present description also proceeds with respect to an example in which the sensors 150, 152 can be deployed on a row unit of a planter. FIG. 1B is a partial pictorial, partial schematic top view of another example of an agricultural system 100 that includes agricultural planting machine 400, towing vehicle 94 that is operated by operator 92, control system 156, and material application control system 413. Systems 156, 413 can be on one or more individual parts of machine 400, centrally located on machine 400, or on towing vehicle 94. Operator 92 can illustratively interact with operator interface mechanisms 96 to manipulate and control vehicle 94, systems 156, 413, and some or all portions of machine 400.

Machine 400 is a row crop planting machine that illustratively includes a toolbar 402 that is part of a frame 404. FIG. 1B also shows that a plurality of planting row units 406 are mounted to the toolbar 402. Machine 400 can be towed behind towing vehicle 94, such as a tractor. FIG. 1B shows that material can be stored in a tank 407 and pumped through a supply line 411 so the material can be dispensed in or near the rows being planted. In one example, a set of devices (e.g., actuators) 409 is provided to perform this operation. For instance, actuators 409 can be individual pumps that service individual row units 406 and that pump material from tank 407 through supply line 411 so the material can be dispensed on the field. In such an example, material application control system 413 controls the pumps 409. In another example, actuators 409 are valves or nozzles and one or more pumps 415 pump the material from tank 407 to valves or nozzles 409 through supply line 411. In such an example, material application control system 413 controls valves or nozzles 409 by generating valve or nozzle control signals, e.g., on a per-seed basis, as described below. The present discussion proceeds by describing the actuator 409 as a valve or actuator. It will be noted that actuator 409 can be a pump, a nozzle, a valve, or another actuator or combination of actuators. The control signal for each actuator 409 can, in one example, be a pulse width modulated control signal. The flow rate through the corresponding valve 409 can be based on the duty cycle of the control signal (which controls the amount of time the valve is open and closed). The flow rate can be based on multiple duty cycles of multiple valves or based on other criteria. Further, the material can be applied in varying rates on a per-seed or per-plant basis. For example, fertilizer may be applied at one rate when the fertilizer is being applied at a location spaced from a seed location and at a second, higher, rate when the fertilizer is being applied closer to the seed location. These are examples only. Sensors 146-154 can be mounted on a structure or structures on machine 400 and processed by control system 156. Sensor 150 is shown mounted to a shank and communicating with control system 156, but sensors 146-154 can be mounted in any other locations as well. Sensors 146-154 can sense sound and/or other vibrations generated by operation of row unit 406. Based on the sensed sounds and/or other vibrations, control system 156 can identify machine characteristics or other characteristics that can be used to generate control signals, as is described in more detail elsewhere herein.

Figure 1C:
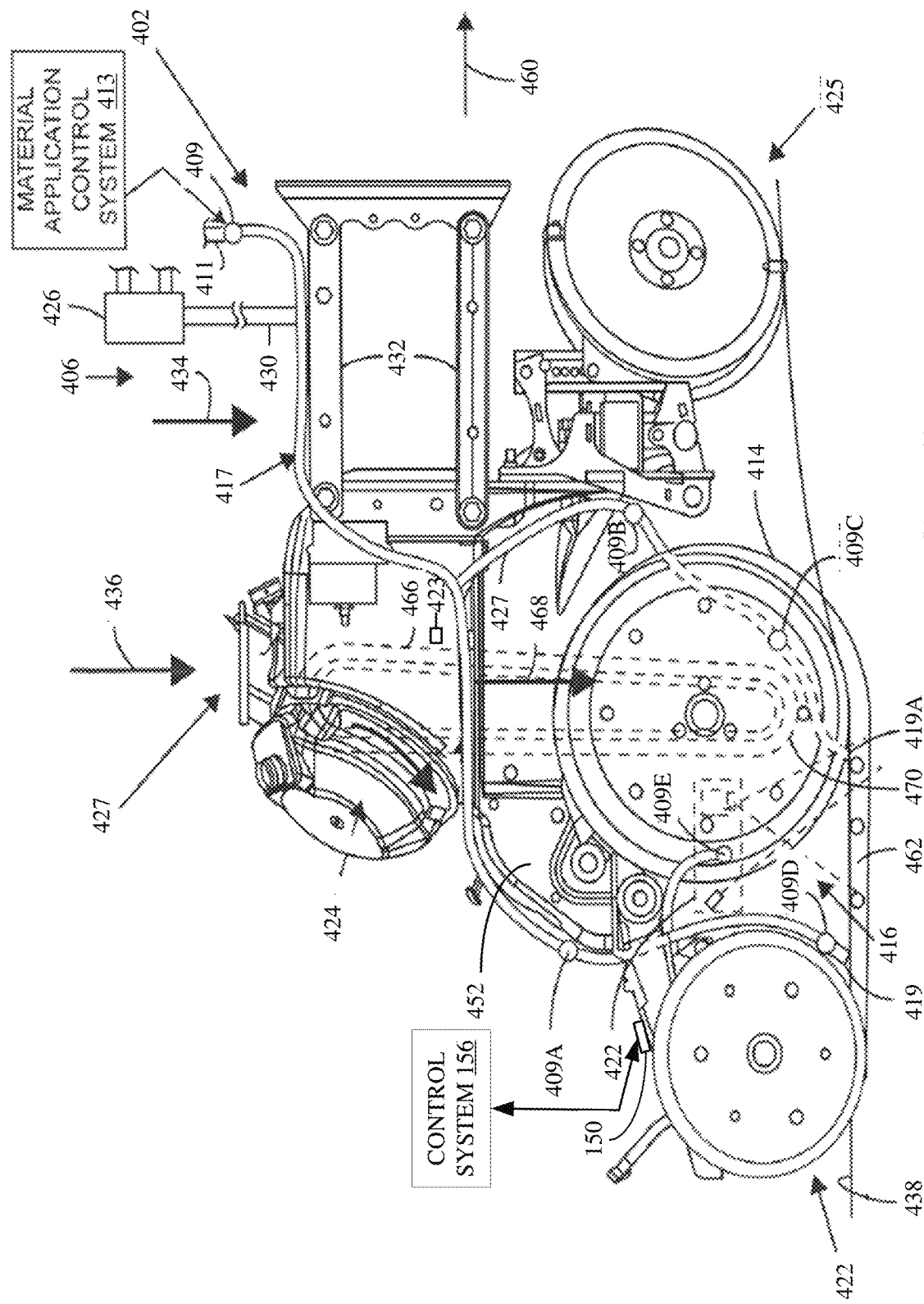
FIG. 1C is a side view of one example of a row unit of the planting machine shown in FIG. 1B.

FIG. 1C is a side view of one example of a row unit 406, with valve 409 and systems 156 and 413 shown as well. Actuator 409 is shown in five possible locations labeled as 409, 409A, 409B, 409C, 409D, and 409E, but other locations are possible as well. Row unit 406 also illustratively includes a seed hopper 427, one or more disc openers 414, a set of gauge wheels 416, and a set of closing wheels 418. Seeds from hopper 427 are fed into a seed meter 424, e.g., by gravity or from a centralized commodity distribution system (e.g., employing pneumatic commodity distribution to each row unit). The seed meter 424 controls the rate at which seeds are dropped into a seed tube or other seed delivery system, such as an assistive seed delivery seed system 466 which may be a brush belt or flighted belt from hopper 427. The seeds can be sensed in the furrow by seed sensor 422, or seed sensor 423 in delivery system 466 or the seeds can be sensed by a seed sensor located elsewhere.

In the example shown in FIG. 1C, liquid material is passed, e.g., pumped or otherwise forced, through supply line 411 to an inlet end of actuator 409. Actuator 409 is controlled by control system 413 to allow the liquid to pass from the inlet end of actuator 409 to an outlet end of actuator 409.

As liquid passes through actuator 409, the liquid travels through an application assembly 417 from a proximal end (which is attached to an outlet end of actuator 409) to a distal tip (or application tip) 419, where the liquid is discharged into a trench, or proximate a trench or furrow 462, opened by disc opener 414 (as is described in more detail below). The distal tip 419 can be located in one or more different locations on row unit 406, some of which are labeled 419 and 419A.

Some parts of row unit 406 will now be discussed in more detail. First, it will be noted that there are different types of seed meters 424, and the one that is shown is shown for the sake of example only. In one example, each row unit 406 need not have its own seed meter. Instead, metering or other singulation or seed dividing techniques can be performed at a central location, for groups of row units 406. The metering systems can include finger pick-up discs and/or vacuum meters (e.g., having rotatable discs, rotatable concave or bowl-shaped devices), among others. The seed delivery system can be a gravity drop system (such as seed tube) in which seeds are dropped through the seed tube and fall (via gravitational force) through the seed tube and out an outlet end into the seed trench 462. Other types of seed delivery systems may be or may include assistive systems 466, in that they do not simply rely on gravity to move the seed from the metering system into the ground. Instead, such an assistive system 466 actively assists the seeds in moving from the meter to a lower opening, where the seeds exit or are deposited into the ground or trench. These can be systems that physically capture the seed and move it from the meter to the outlet end of the seed delivery system or they can be pneumatic systems that pump air through the seed tube to assist movement of the seed. The air velocity can be controlled to control the speed at which the seed moves through the delivery system.

The seed delivery system shown in FIG. 1C is an assistive seed delivery system 466. Assistive seed delivery system 466 may have a seed sensor 423 disposed thereon. Assistive seed delivery system 466 captures the seeds as they leave seed meter 424 and moves the seeds in the direction indicated by arrow 468 toward furrow 462. System 466 has an outlet end 470 where the seeds exit assistive system 466, into furrow 462, where the seeds reach their final resting location. Also, it should be noted that there can be more than one sensor 146-154, more than one seed sensor 422, 423, sensors of different types, sensors at different locations, etc. 7

Figure 3:
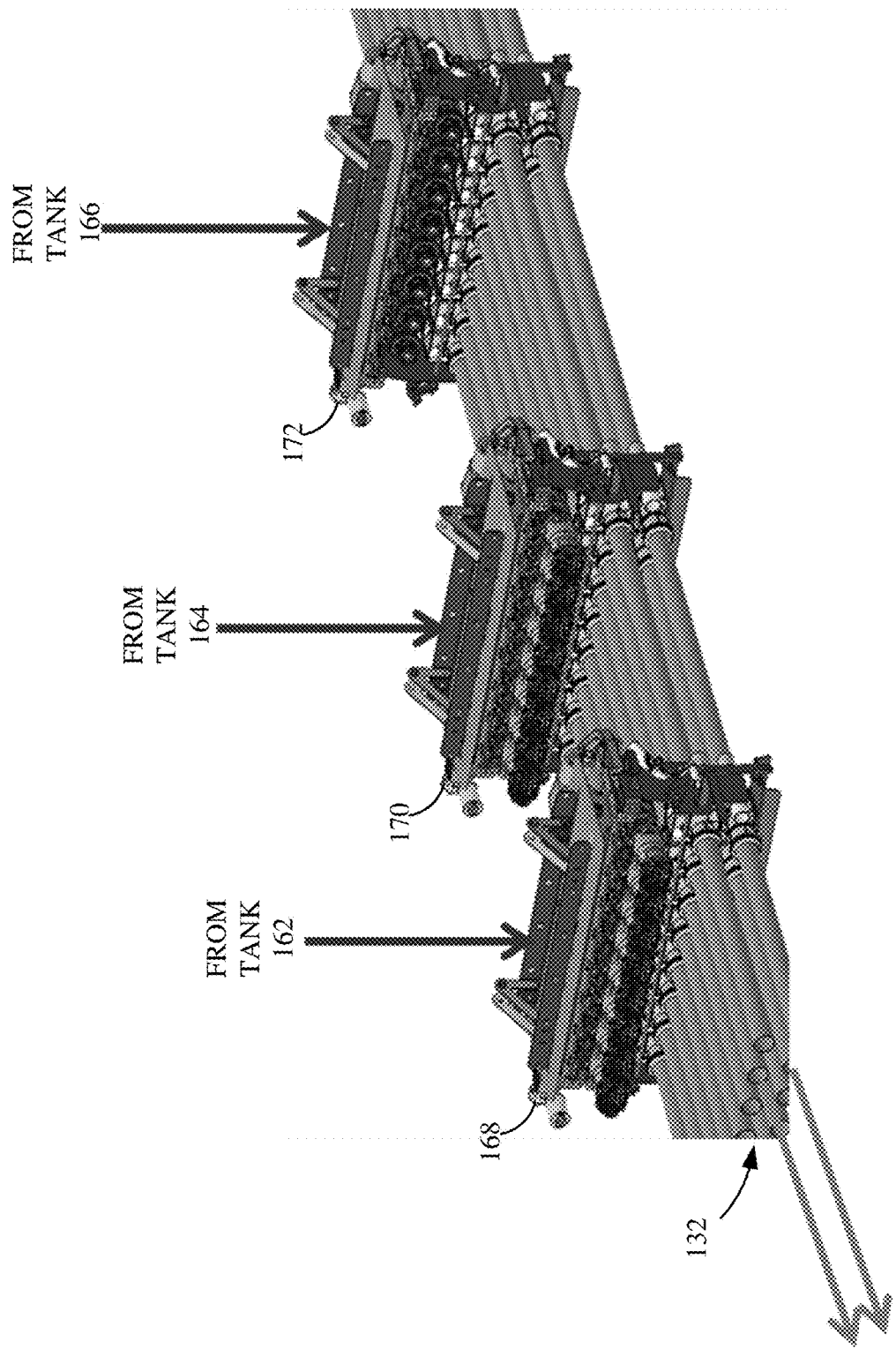
FIG. 3 is perspective view of metering devices and primary delivery tubes.

FIG. 3 shows that row unit 406 also includes row cleaner 425 which clears residue or other material ahead of the opener 414.

A downforce actuator 426 is mounted on a coupling assembly 428 that couples row unit 406 to toolbar 402. Actuator 426 can be a hydraulic actuator, a pneumatic actuator, a spring-based mechanical actuator, or a wide variety of other actuators. In the example shown in FIG. 1C, a rod 430 is coupled to a parallel linkage 432 and is used to exert an additional downforce (in the direction indicated by arrow 434) on row unit 406. The total downforce (which includes the force indicated by arrow 434 exerted by actuator 426, plus the force due to gravity acting on row unit 406, and indicated by arrow 436) is offset by upwardly directed forces acting on closing wheels 418 (from ground 438) and on row cleaner 425 (from ground 438) and disc opener 414 (again from ground 438). The differential force (which may also be referred to herein as the downforce margin) acts on the gauge wheels 416. The gage wheels 416 can be set to control the depth of the furrow 462 opened by openers 414. The load on gage wheel 416 can be sensed by a gauge wheel load sensor, which may be located anywhere on row unit 406 where it can sense that load. A set of gauge wheel control arms (or gauge wheel arm) movably mount gauge wheels 416 to shank or frame 452 and control an offset between gauge wheels 416 and the discs in double disc opener 414, to control planting depth.

In operation, row unit 406 travels generally in the direction indicated by arrow 460. The double disc opener 414 opens a furrow 462 in the soil 438, and the depth of the furrow 462 is set by planting depth actuator assembly 454, which, itself, controls the offset between the lowest parts of gauge wheels 416 and disc opener 414. Seeds are moved by assistive seed delivery system 466 into the furrow 462 and closing wheels 418 close the furrow 462, e.g., push soil back into the furrow 462.

Seeds can be sensed by seed sensor 423 in assistive delivery system 466. When the seeds are placed into the furrow 462, the seeds can be sensed by seed sensor 422. The seed sensors can be placed in a variety of different locations on row unit 406, or on different components of row unit 406.

Material application control system 413 illustratively receives a signal from one of the seed sensors. Material application control system 413 can also receive a ground speed signal indicative of a speed of movement of row unit 406, and then determines when to actuate actuator 409 so that material being applied through application assembly 417 (and out distal tip 419 of application assembly 417) will be applied at a desired location relative to the seed in trench or furrow 462 and/or based on other planting characteristics identified by material application control system 413 or elsewhere.

By way of example, it may be that some material is to be applied directly on the seed. In that case, system 413 times the actuation of actuator 409 so that the applied material will be applied at the seed location. In another example, it may be desirable to apply some material at the seed location and also apply material for a predetermined distance on either side of the seed location. In that case, system 413 generates the signal used to control actuator 409 so that the material is applied in the desired fashion. In other examples, it may be that the material is to be applied at a location between seeds in furrow 462. By way of example, relatively high nitrogen fertilizer may be most desirably applied between seeds, instead of directly on the seed. In that case, system 413 is illustratively programmed with the desired location of the applied material relative to seed location, so that system 413 can determine when to actuate actuator 409 in order to apply the material between seeds. Further, as discussed above, actuator 409 can be actuated to dispense material at a varying rate. System 413 can control multiple actuators 409 to apply different material relative to different seeds, to aim a nozzle through which the material travels or to otherwise aim the material relative to the seed location, or to control the shape of the spray existing the tip 419. As another example, it may be that two or more different types of seed are being planted and the seed sensor generates an output indicative of the location of the sensed seed and the type of seed detected. System 413 can then generate control signals to apply a first type of material (or quantity of material) to seeds of a first type and a second type of material (or quantity of material) to seeds of a second type. In another example, system 413 can control actuator 409 to dispense more material on the seed location and less material at locations spaced from the seed location, or vice versa, or according to other patterns.

Figure 2:
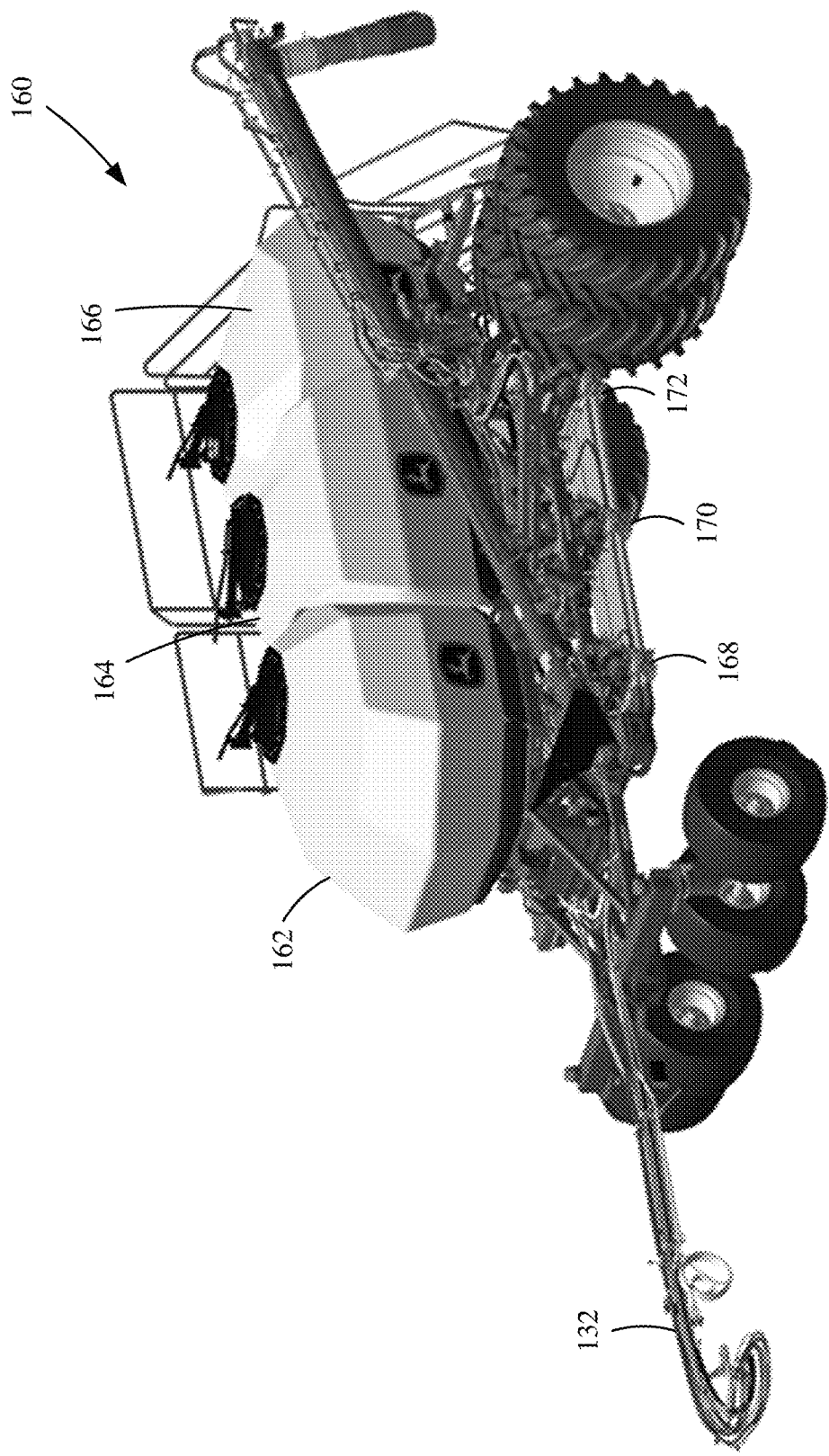
FIG. 2 is a perspective view of an air cart.

FIG. 2 is a pictorial illustration of another example of an air cart 160. Air cart 160 is similar to air cart 108 in FIG. 1, except that air cart 160 has three tanks 162, 164, and 166. Each tank has a corresponding metering system 168, 170, and 172 that meters material from the corresponding tanks into one or more of the primary delivery tubes 132.

FIG. 3 shows a portion of air cart 160 with the tanks, wheels, and other portions removed, to show metering systems 168, 170, and 172 more clearly. FIG. 3 shows that material from tank 162 is metered by meter 168 into one or more of the primary delivery tubes 132. Similarly, material from tank 164 is metered by metering system 170 into the primary delivery tubes 132, and material from tank 166 is metered by metering system 172 into the primary delivery tubes 132. Any number N of metering systems can meter any number of different materials into the same primary delivery tube 132. In one example, a plurality of the metering systems 168, 170, and 172 can meter material into the same primary delivery tube 132. For instance, in one example, material from tanks 162 and 164 can be metered by metering systems 168 and 170 into the same primary delivery tube 132, while material from tank 166 is metered by metering system 172 into a separate primary delivery tube 132. Therefore, the primary delivery tubes 132 may carry a single type of material, or a plurality of different types of material. It will also be noted that blockages may occur within the tanks 162, 164, or 166, or within the metering systems 168, 170, or 172, or on either side of the metering systems (e.g., on the input side from the tanks or on the output side to the primary delivery tubes).

In accordance with the present example, the acoustic/vibration sensors in the secondary delivery lines 138 generate an acoustic or vibration signal that can be used by control system 156 to identify whether the proper materials are moving through the primary delivery tubes 132 and secondary delivery lines 138, and whether the materials are in the proper proportion relative to one another. Therefore, if, for instance, acoustic/vibration sensor 146 is supposed to be sensing two different materials, but only generates an acoustic signal that has an acoustic signature indicative of a single material, then control system 156 can identify that the second material is missing from the secondary delivery line 138. Thus, the primary delivery tube 132 that services that secondary delivery line 138 will also be missing that material (since it is not reaching line 138). Thus, control system 156 can identify the particular meter or tank or line 138 where a blockage has occurred.

Figure 4A:
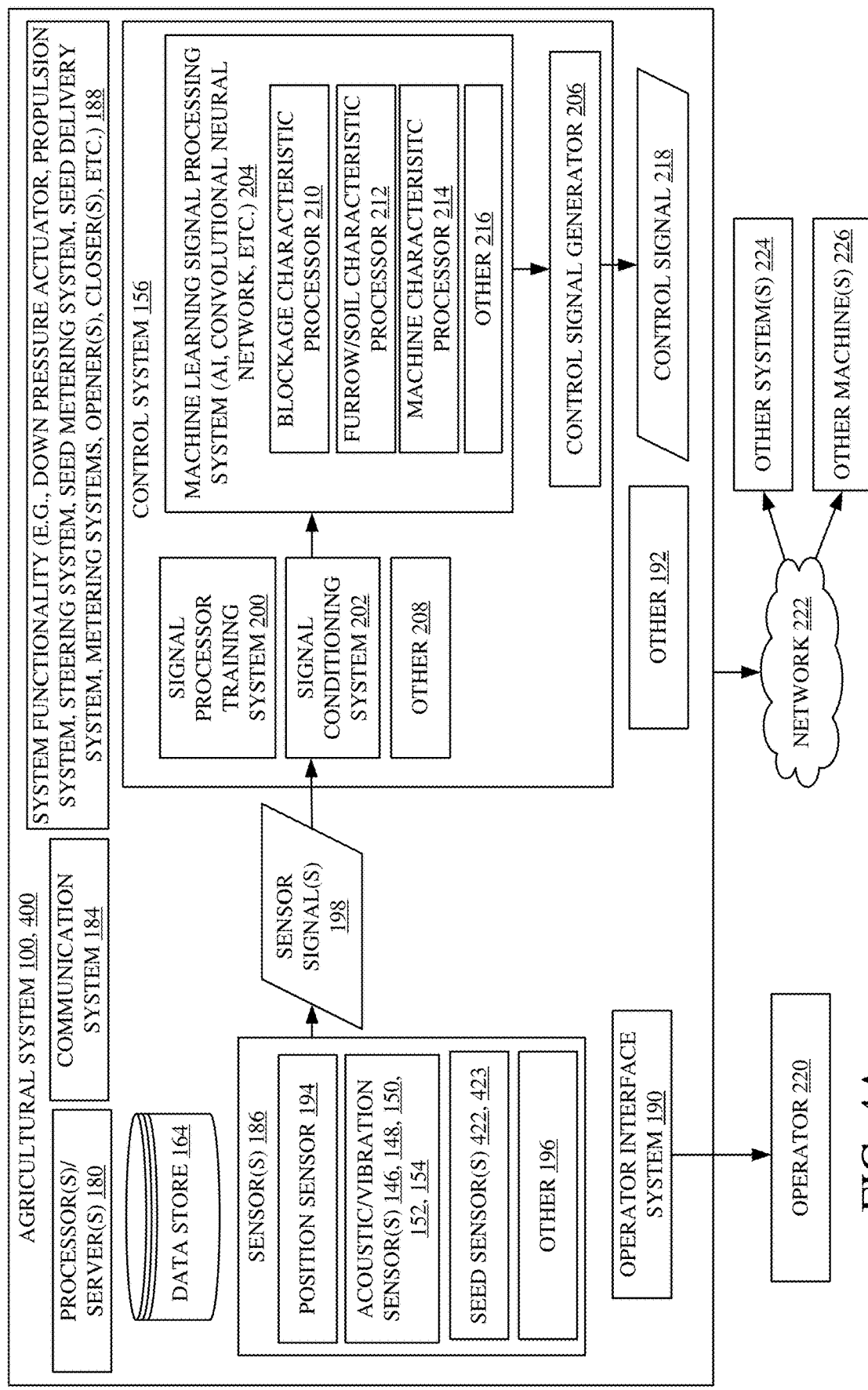
FIG. 4A is a block diagram of one example of an agricultural system.

FIG. 4A is a block diagram showing one example of a portion of agricultural system 100. Some items shown in FIG. 4A are similar to those shown in previous figures, and they are similarly numbered. In the example shown in FIG. 4A agricultural system 100 includes one or more processors or servers 180, data store 182, communication system 184, sensors 186, system functionality 188 (which can include such things as metering systems, down pressure—or downforce—actuators, a propulsion system, a steering system, seed metering system(s), seed delivery systems(s), etc.), control system 156, operator interface system 190, and a wide variety of other items 192. Sensors 186 can include a position sensor 194 as well as one or more acoustic/vibration sensors, such as sensors 146, 148, 150, 152, and 154 discussed above. Sensors 186 can include seed sensors 422, 423, and/or a wide variety of other sensors 196 as well. The sensors 186 generate sensor signals 198 and provide those sensor signals to control system 156. Control system 156 can include signal processor training system 200, signal conditioning system 202, signal processing system (e.g., an advanced signal processing system such as FFTs with windowing or level crossing thresholds, a machine learning system, such as AI, convolutional neural network, etc.) 204 (signal processing system 204), control signal generator 206, and other items 208. Signal processing system 204 can include blockage characteristic processor 210, furrow/soil characteristic processor 212, machine characteristic processor 214, and other items 216. Control signal generator 206 is shown generating a control signal 218.

FIG. 4A also shows that an operator 220 can interact with operator interface system 190 to operate some or all of the portions of agricultural system 100. For instance, operator 220 may be in an operator's compartment of tractor 106, 94, or elsewhere.

FIG. 4A also shows that agricultural system 100 can be connected over network 222 to other systems 224 or other machines 226. Therefore, network 222 may be a wide area network, a local area network, a near field communication network, a Wi-Fi network, a Bluetooth network, a cellular communication network, or any of a wide variety of other networks or combinations of networks. Other systems 224 can include farm manager systems, manufacturer systems, vendor systems, or a wide variety of other systems. Other machines 226 can include other machines operating in the same field as tractor 106, 94, machines operating in different fields, tender vehicles, or machines performing subsequent operations in the present field or other machines.

Before describing the operation of agricultural system 100 in more detail, a description of some of the items in system 100, and their operation, will first be provided.

Communication system 184 enables communication of the items in agricultural system 100 with one another. Therefore, system 184 may be a controller area network (CAN) bus and bus controller, or other communication systems. Further, communication system 184 may enable communication over network 222 to communicate with other systems 224, other machines 226, etc. Therefore, communication system 184 may vary depending on the type of network 222 over which it is to communicate.

Operator interface system 190 can include mechanisms 96 (from FIG. 1B) or any of a wide variety of operator interface mechanisms and corresponding logic used to control those mechanisms. For instance, operator interface system 190 can include a steering wheel, joysticks, levers, linkages, a microphone and speakers (e.g., where speech recognition and/or speech synthesis is provided), a display screen, a touch sensitive display screen, or other items. Where a display screen is used, user actuatable input mechanisms can be displayed to display user information and receive user inputs. Those mechanisms can include such things as icons, links, buttons, etc. The mechanisms can be actuated using a point and click device, touch gestures, etc. System 190 can include any of a wide variety of other audio, visual, and/or haptic output/input devices.

Position sensor 194 can be a global navigation satellite system (GNSS) receiver, a cellular triangulation system, a dead reckoning system, or any of a wide variety of other sensors that sense the position of agricultural system 100 in a global or local coordinate system. Acoustic/vibration sensors 146, 148, 150, 152, and 154 (sensors 146-154) can be similar to one another or different. For instance, the sensors 146-154 can be microphone sensors that sense audio sounds, such as grain striking a grain strike sensor, noises corresponding to bearings, stethoscope impact plate sensors (one of which is described below with respect to FIG. 4B), piezoelectric sensors, inertial measurement units (IMUs), etc. By way of example, sensors 146-154 can include a piezoelectric sensor element that continuously captures a vibration amplitude with respect to time. The force acting on the piezoelectric element may be the force of grain or other material impacting the piezoelectric sensor element. The piezoelectric sensor element may convert the vibrations into corresponding voltage amplitude, continuously with respect to time, to generate a time varying amplitude wave form signal as an acoustic data stream. Other sensors can be used as well. The sensors 186 generate sensor signals 198 and provide those signals to control system 156.

Signal conditioning system 202 may perform signal conditioning on the sensor signals 198. Such signal conditioning may include amplification, linearization, normalization, filtering, etc.

Signal processing system 204 receives the conditioned signals and generates an output indicative of sensed parameters or characteristics. For instance, the input to signal processing system 204 may be an acoustic or vibration signal. Signal processing system 204 may, itself, be a convolutional neural network, or another type of machine learning or artificial intelligence or advanced processing system. Signal processing system 204 may identify features in the acoustic or vibration signal and classify those features to provide an output signal indicative of certain characteristics represented by the features in the acoustic or vibration signal. By way of example, blockage characteristic processor 210 may be trained to identify the acoustic signatures of different types of material that may be sensed by sensors 146-154. When those signatures are missing from the acoustic signal, blockage characteristic processor 210 may generate an output indicating that flow of a certain material is not reaching the corresponding sensors. Similarly, the signatures or patterns in the acoustic or vibration signal may vary based on the amount of each material sensed by the sensor. Therefore, the blockage characteristic processor 210 may be trained to recognize the amounts of each material, based on the acoustic signature or vibration patterns in the acoustic/vibration signals. Thus, the blockage characteristics generated by blockage characteristic processor 210 may also indicate the ratios of the different materials being sensed by the sensor. The blockage characteristics can be other characteristics that identify materials, blockages, partial blockages, which meters, tanks, or delivery tubes are blocked, material quantity and/or material ratios, etc.

Furrow/soil characteristic processor 212 may receive an acoustic or vibration signal that captures acoustic or vibration features (e.g., acoustic signatures or vibration patterns) corresponding to the tillage implement 104 or machine 400 traveling through soil. Such features may include an acoustic or vibration signature that may have one form when the soil is relatively clear of obstructions, and may have another form when the soil contains residue, rocks, or other objects. The acoustic or vibration signatures may vary based on the soil type, soil moisture, or other soil or furrow characteristic. Thus, furrow/soil characteristic processor 212 can be trained to extract acoustic or vibration features (e.g., patterns and/or signatures) and generate an output, based upon those features, indicative of characteristics of the furrow and/or soil.

Machine characteristic processor 214 may receive an acoustic signal or vibration signal and extract features from that signal indicative of characteristics of the machine (such as whether bearings are rotating, whether the seed delivery systems and seed metering systems or other machine parts are operating properly, whether the machine is in a proper position—e.g., in engagement with the soil, whether parts are worn, the degree of wear, etc.). Machine characteristic processor 214 can then generate an output indicative of the characteristics of the machine identified by the extracted features of the acoustic or vibration signal.

Signal processor training system 200 can be used to train signal processing system 204 to identify the particular characteristics that are being identified. For instance, the signal processor training system 200 may be a supervised or unsupervised, machine learning system that trains signal processing system 204 based upon labeled training data or unlabeled training data. As an example, the training data may represent conditions that are to be sensed by blockage characteristic processor 210, furrow/soil characteristic processor 212, machine characteristic processor 214, or other processing systems.

Control signal generator 206 can then generate control signals based upon the blockage characteristics, the furrow/soil characteristics, and/or the machine characteristics output by signal processing system 204. For instance, the control signal 218 can control operator interface system 190 to generate an alert or warning output to operator 220. The alert may identify, for example, which tank or meter is blocked, what type of equipment is malfunctioning or is about to wear out, an indication that a furrow contains an undesirable amount of residue, etc. Control signal generator 206 can also generate a control signal to provide a geographic tag (geotag) to the characteristic so that the location where the characteristic was sensed can be stored and processed in other ways. By way of example, assume that furrow/soil characteristic processor 212 generates an output indicating that the tillage implement 104 has struck a rock. Control signal generator 206 can generate a control signal that outputs an indication of the rock strike, along with its geographic location, so that subsequent operations in the field can be controlled to avoid hitting the rock. Signal processing system 204 may also correlate sensed characteristics to the machine, material, and/or environmental conditions by storing metadata representing the machine, material and/or environmental conditions along with the detected characteristics. Control signal generator 206 may generate a control signal to store the identified characteristics locally in data store 182 and/or remotely in another system 224. Control signal generator 206 can generate a control signal to control communication system 184 to communicate the identified characteristics to other systems 224 or other machines 226 over network 222. Control signal generator 206 can generate a stop signal (such as for an autonomous machine), a down force control signal to change down force on a row unit, or other control signals. The control signal can take a wide variety of other forms as well.

Figure 4B:
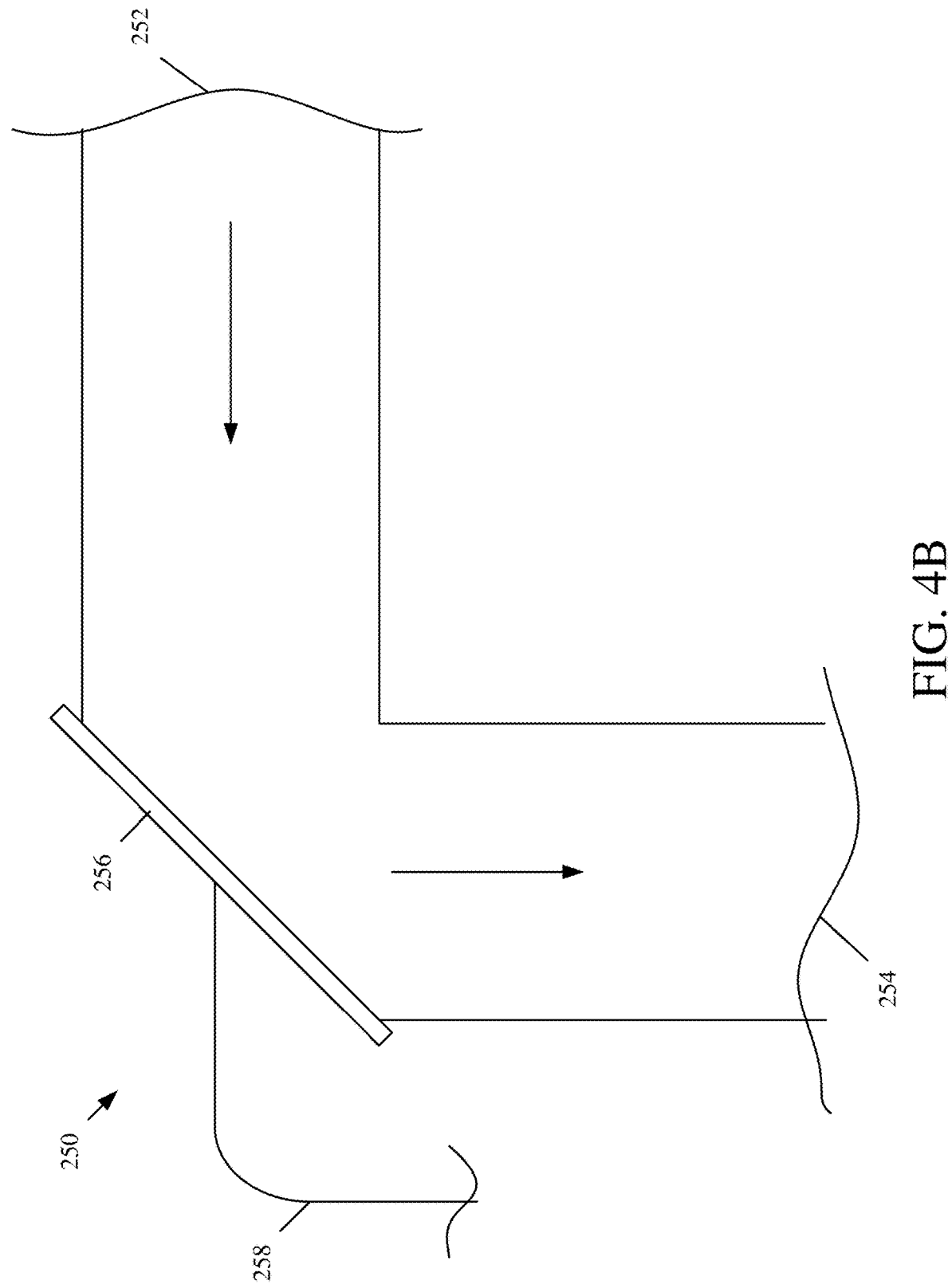
FIG. 4B an illustration of one example of an acoustic/vibration sensor.

Before describing the operation of agricultural system 100 in more detail, a description of one example of an acoustic blockage sensor will be described. FIG. 4B shows one example of an acoustic blockage sensor 250. Sensor 250 can be one or more of the acoustic/vibration sensors 146, 148, 150, 152, and/or 154. In one example, sensor 250 includes a material input opening 252 and a material output opening 254. Material to be sensed flows in through input opening 252 and contacts stethoscope impact plate 256. In one example, in which sensor 250 is disposed in a secondary line 138 (shown in FIG. 1), the material passing through the secondary lines 138 is directed through the input opening 252 of acoustic blockage sensor 250 and impacts the stethoscope impact plate 256. The sound generated by that impact transitions through a conduit 258 (which may be a rubber tube or another type of tube). The material is then deflected to the output opening 254 of acoustic blockage sensor 250 where the material continues to flow through the secondary line 138. The sound on stethoscope impact plate 256 is transmitted through conduit 258 to a microphone input on control system 156.

In one example, there may be multiple materials traveling through sensor 250, and those materials will have different densities. Thus, each of the different materials create a different sound when impacting the stethoscope impact plate 256. Therefore, in one example, signal processor training system 200 trains signal processing system 204 to recognize the acoustic signature generated by each material and different amounts of each material, as each material is sent through the acoustic sensor 250. In one example, a plurality of different materials can be sent through sensor 250 at the same time, in different conditions, in different ratios relative to one another, etc. so training system 200 can train signal processing system 204 on those conditions and ratios as well. This allows the signal processing system 204 to learn the sound signature of each product, and of different product combinations. Once the learning has been completed, then signal processing system 204 can differentiate the flow of the different materials through acoustic blockage sensor 250, even when multiple different materials are sent through the sensor 250 at the same time. Blockage characteristic processor 210 can, for example, identify the materials, which material is blocked or partially blocked and, by knowing which tank and meter is providing each material, identify the particular tank or meter where the blockage is occurring.

Figure 5A:
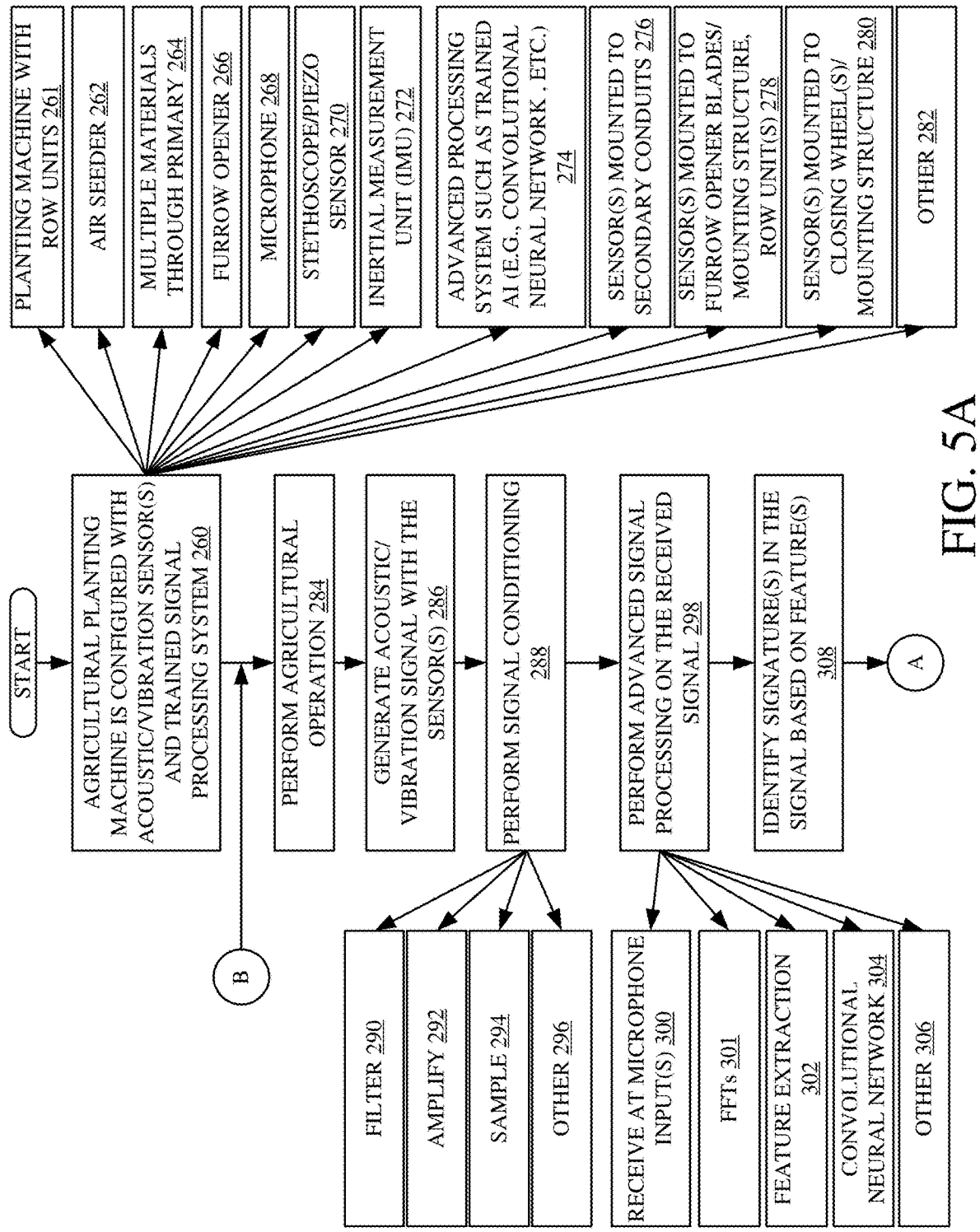
FIGS. 5A and 5B (collectively referred to herein as FIG. 5) show a flow diagram illustrating one example of the operation of the agricultural system.
Figure 5B:
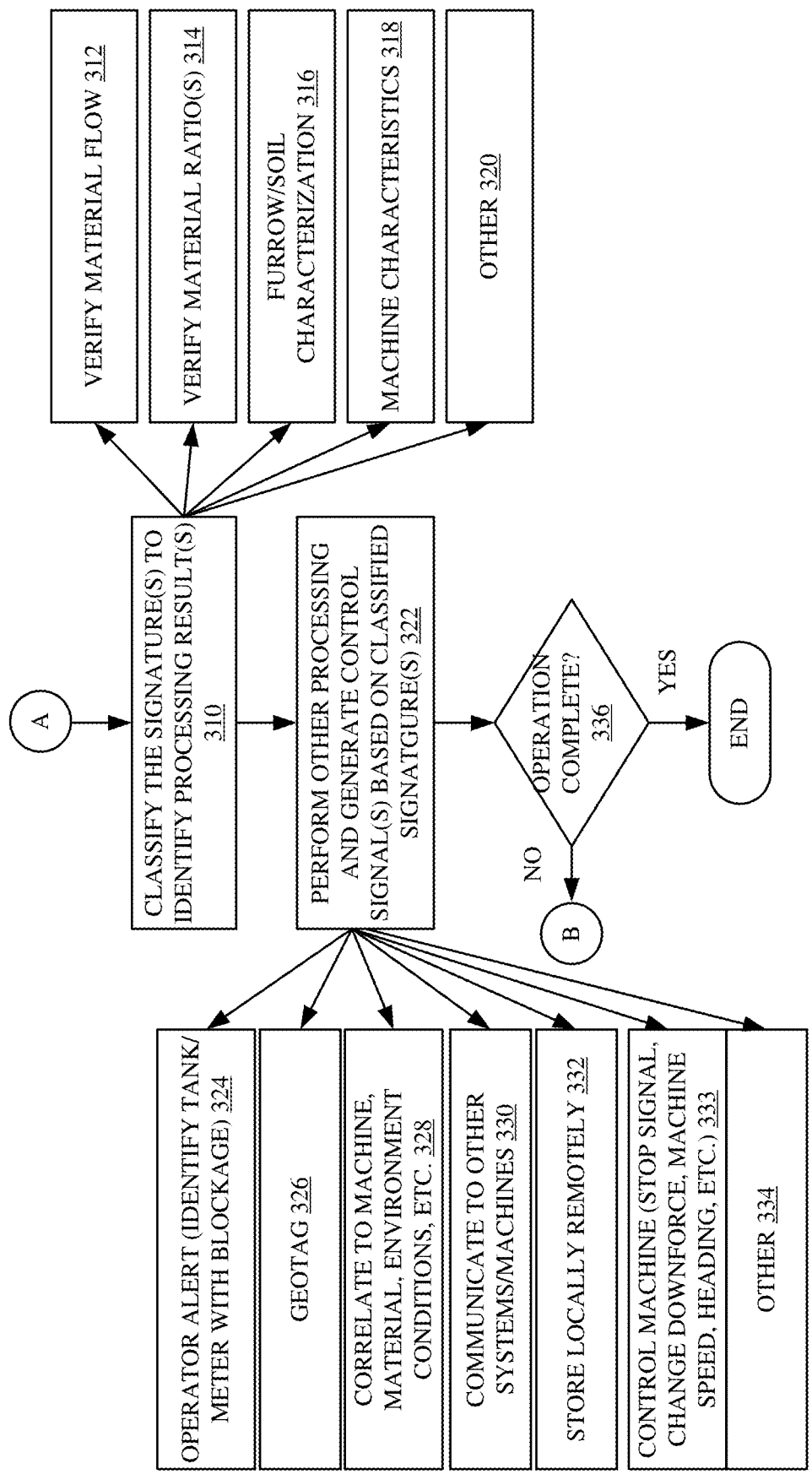

FIG. 5 is a flow diagram illustrating one example of the operation of agricultural system 100. It is first assumed that an agricultural planting machine is configured with acoustic/vibration sensors and with a trained signal processing system, as indicated by block 260 in the flow diagram of FIG. 5. The agricultural planting machine can be an agricultural planting machine 400 with row units 406 as indicated by block 261, an air seeder 262 or any of a wide variety of other planting machines. In one example, the planting machine can provide multiple materials through a primary tube, and through secondary tubes, through meters on an air cart, as indicated by block 264. The planting machine can have a furrow opener 266, and the acoustic/vibration sensors can be one or more microphones 268. The acoustic/vibration sensors can be stethoscope or piezo sensors 270, inertial measurement units 272, or other sensors. The planting machine can include a signal processing system which may be an advanced signal processing system such as a trained machine learning, artificial intelligence processing system 274, which may include such things as a convolutional neural network, etc. The acoustic/vibration sensors may be mounted to the secondary conduits, as indicated by block 276. The acoustic/vibration sensors may be mounted to the furrow opener blades or the mounting structure for the furrow opener blades, or elsewhere on a row unit 406 as indicated by blocks 278. The acoustic/vibration sensors may be mounted to the closing wheels or the mounting structure for the closing wheels as indicated by block 280. The acoustic/vibration sensors may be mounted any other places in order to sense acoustics or vibrations of any type that may be of interest in identifying characteristics. The agricultural planting machine may be configured in a wide variety of other ways with acoustic/vibration sensors and a trained or configured signal processing system, as indicated by block 282 in the flow diagram of FIG. 5.

The agricultural planting machine then begins performing the agricultural operation, as indicated by block 284 in the flow diagram of FIG. 5. During performance of the agricultural operation, the acoustic/vibration sensors generate acoustic/vibration sensor signals 198 which are provided to control system 156. Generating the acoustic/vibration sensor signals is indicated by block 286 in the flow diagram of FIG. 5. Signal conditioning system 202 may then perform signal conditioning, as indicated by block 288. The signal conditioning can include filtering 290, amplifying 292, sampling 294, and/or any of a wide variety of other signal conditioning 296.

Signal processing system 204 then performs signal processing with an advanced signal processor such as a machine learning signal processor (e.g., FFTs, an artificial intelligence system, convolutional neural network, etc.) on the received signals, as indicated by block 298 in the flow diagram of FIG. 5. The received signals can be received at microphone inputs, as indicated by block 300. The signal processing can include applying FFTs 301, feature extraction 302 and processing by a convolutional neural network 304. The advanced processing can take a wide variety of other forms 306 as well.

The acoustic signatures or vibration patterns in the sensor signal can then be identified as, or in response to, extracted features, as indicated by block 308. The signatures are then classified (or otherwise processed) by the signal processing system 204 in order to identify the processing results, as indicated by block 310. Signal processing system 204 can use blockage characteristic processor 210 to perform operations that identify blockage characteristics. Such characteristics can include identifying different materials and/or verifying material flow of the different materials expected through the system, as indicated by block 312. Blockage characteristic processor 210 can verify that the different materials are being delivered through the machine in the expected or desired ratios, as indicated by block 314. If not, the source of the blockage or partial blockage (e.g., tank, meter, etc.) can be identified. Processor 210 can identify other blockage characteristics as well.

Furrow/soil characteristic processor 212 may perform furrow/soil characterization 316 based upon the sensor signals and the identified acoustic signatures or vibration patterns. Machine characteristic processor 214 can identify machine characteristics 318, and/or signal processing system 204 can perform a wide variety of other processing 320 as well.

Control signal generator 206 can generate control signals based upon the classified acoustic signatures or vibration patterns, as indicated by block 322 in the flow diagram of FIG. 5. By way of example, signal processing system 204 can geotag the characteristics, as indicated by block 326. For instance, signal processing system 204 can obtain the geographic position (where the acoustic/vibration signal was generated) from position sensor 194 and correlate that with the characteristics that are identified (the blockage characteristics, the furrow/soil characteristics, the machine characteristics, etc.). The signal processing system 204 can also correlate the identified characteristics to different environmental conditions, material conditions, machine conditions, etc., as indicated by block 328. The environmental conditions may include such things as soil characteristics, humidity or other weather conditions. The material conditions may include such things as material type, material density, material moisture, etc. The machine characteristics may include such things as machine speed, machine orientation or pose, machine location and heading, air pressures, machine temperature, fan speeds, or any of a wide variety of other machine characteristics.

The control signal can be used to control operator interface system 190 to generate an operator alert, and/or to identify the problem, such as the meter and tank that are blocked, the location of an obstacle or residue, and/or other blockage, furrow/soil, or machine characteristics. Generating an operator alert is indicated by block 324 of FIG. 5.

Control signal generator 206 can generate a control signal to control communication system 184 to communicate the identified characteristics to other systems 224 or other machines 226, as indicated by block 330 in the flow diagram of FIG. 5.

Control signal generator 206 can generate the control signal to control data store 182 to store the identified characteristic and any other metadata (such as conditions, geographic location, etc.) locally on data store 182 or remotely on another system 224, as indicated by block 332 in the flow diagram of FIG. 5. Control signal generator 206 can generate the control signal to control the machine (such as a stop signal to stop the machine, a signal to change machine speed or machine heading, a signal to change downforce, etc.) as indicated by block 333. Signal processing system 204 and control signal generator 206 can perform other processing and generate a wide variety of other control signals as well, as indicated by block 334 in the flow diagram of FIG. 5.

Until the operation is complete, as indicated by block 336 in FIG. 5, processing reverts to block 284 where the agricultural planting machine continues to perform the agricultural operation.

It can thus be seen that the present description describes a system in which acoustic/vibration sensors are used to generate acoustic/vibration signals. Different features, patterns, and/or signatures can be identified in the acoustic/vibration signals and those features, patterns, and/or signatures can be processed by a machine learning or artificial intelligence processing system to identify different blockage characteristics, furrow/soil characteristics, machine characteristics, and/or other characteristics. The identified characteristics can be used to generate control signals.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface displays have been discussed. The displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components, generators, and/or logic. It will be appreciated that such systems, components and/or logic can be comprised of hardware items (such as processors and associated memory, or other processing components, some of which are described below) that perform the functions associated with those systems, components, generators, and/or logic. In addition, the systems, components, generators, and/or logic can be comprised of software that is loaded into a memory and is subsequently executed by a processor or server, or other computing component, as described below. The systems, components, generators, and/or logic can also be comprised of different combinations of hardware, software, firmware, etc., some examples of which are described below. These are only some examples of different structures that can be used to form the systems, components, generators, and/or logic described above. Other structures can be used as well.

Figure 6:
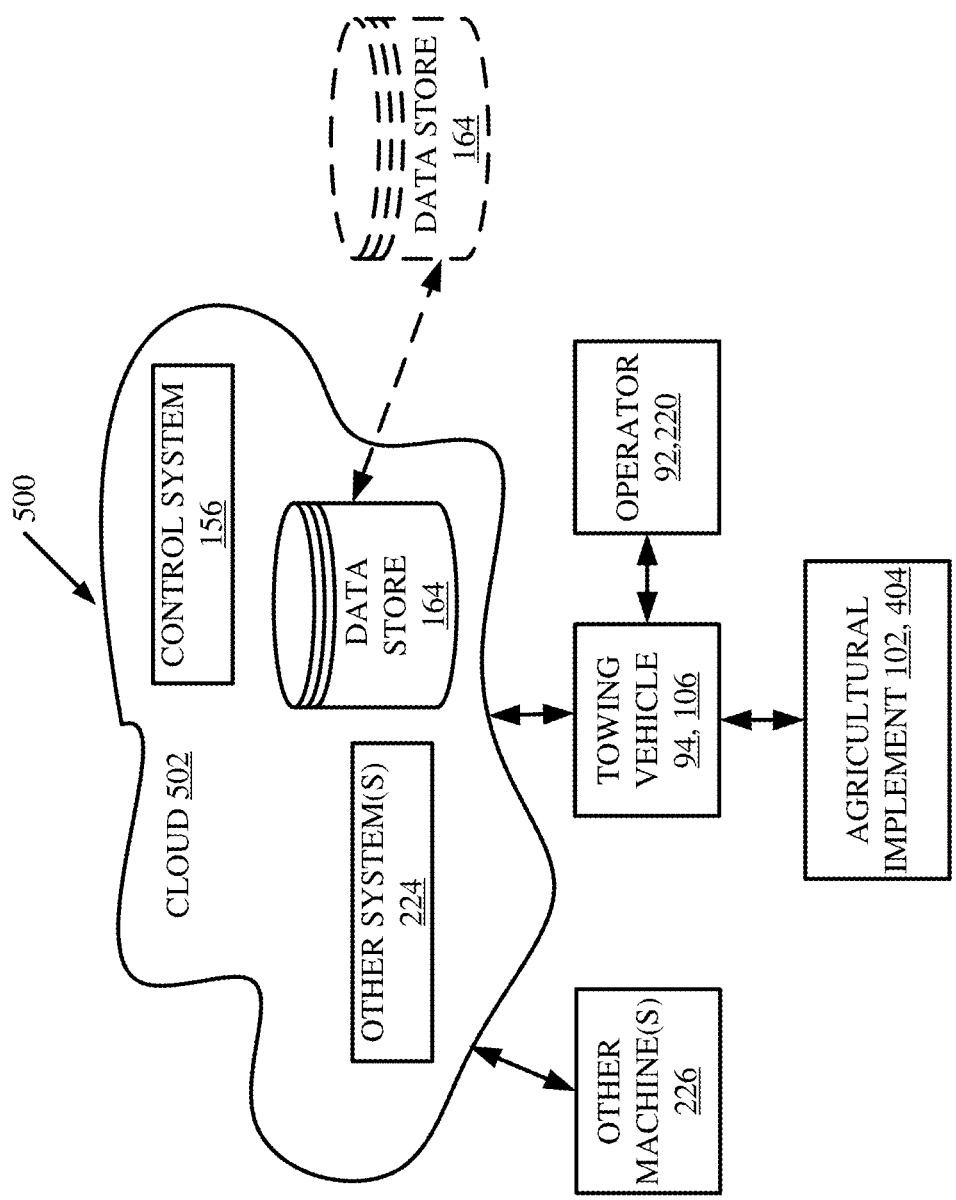
FIG. 6 is a block diagram of one example of a remote server architecture.

FIG. 6 is a block diagram of system 100, shown in FIGS. 1A, 1B and 4A, except that system 100 communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in previous FIGS. as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 6, some items are similar to those shown in previous FIGS. and they are similarly numbered. FIG. 6 specifically shows that system 156 and system(s) 224, and data store 164 can be located at a remote server location 502. Therefore, system 100 accesses those systems through remote server location 502.

FIG. 6 also depicts another example of a remote server architecture. FIG. 6 shows that it is also contemplated that some elements of previous FIGS are disposed at remote server location 502 while others are not. By way of example, data store 164 can be disposed at a location separate from location 502, and accessed through the remote server at location 502. Regardless of where the items are located, the items can be accessed directly by system 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As the tractor comes close to the fuel truck for fueling, the system automatically collects the information from the tractor using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the tractor until the tractor enters a covered location. The tractor, itself, can then send the information to the main network.

It will also be noted that the elements of previous FIGS., or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
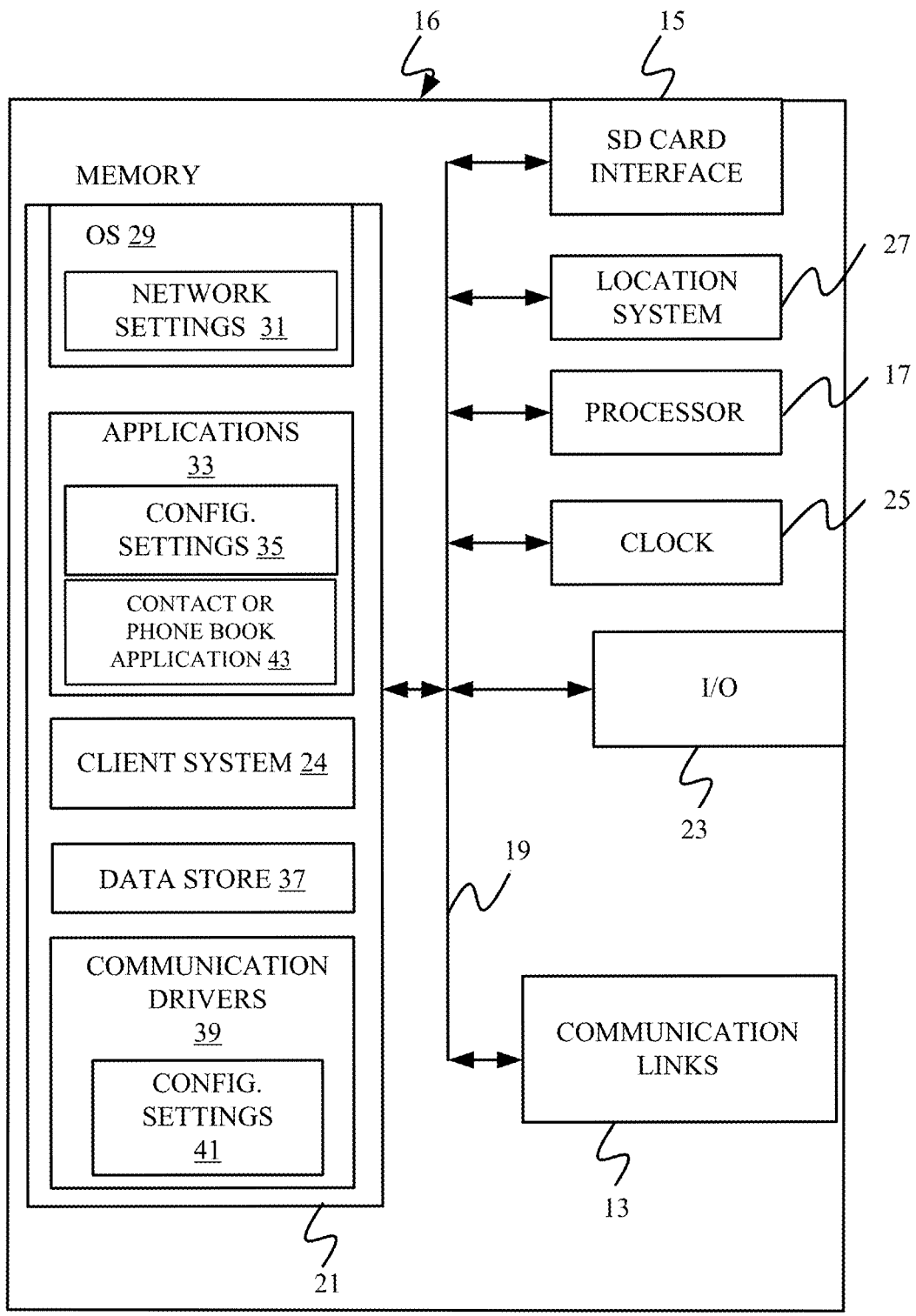
FIGS. 7-9 show examples of mobile devices that can be used in the systems and architectures shown in the previous FIGS.
Figure 8:
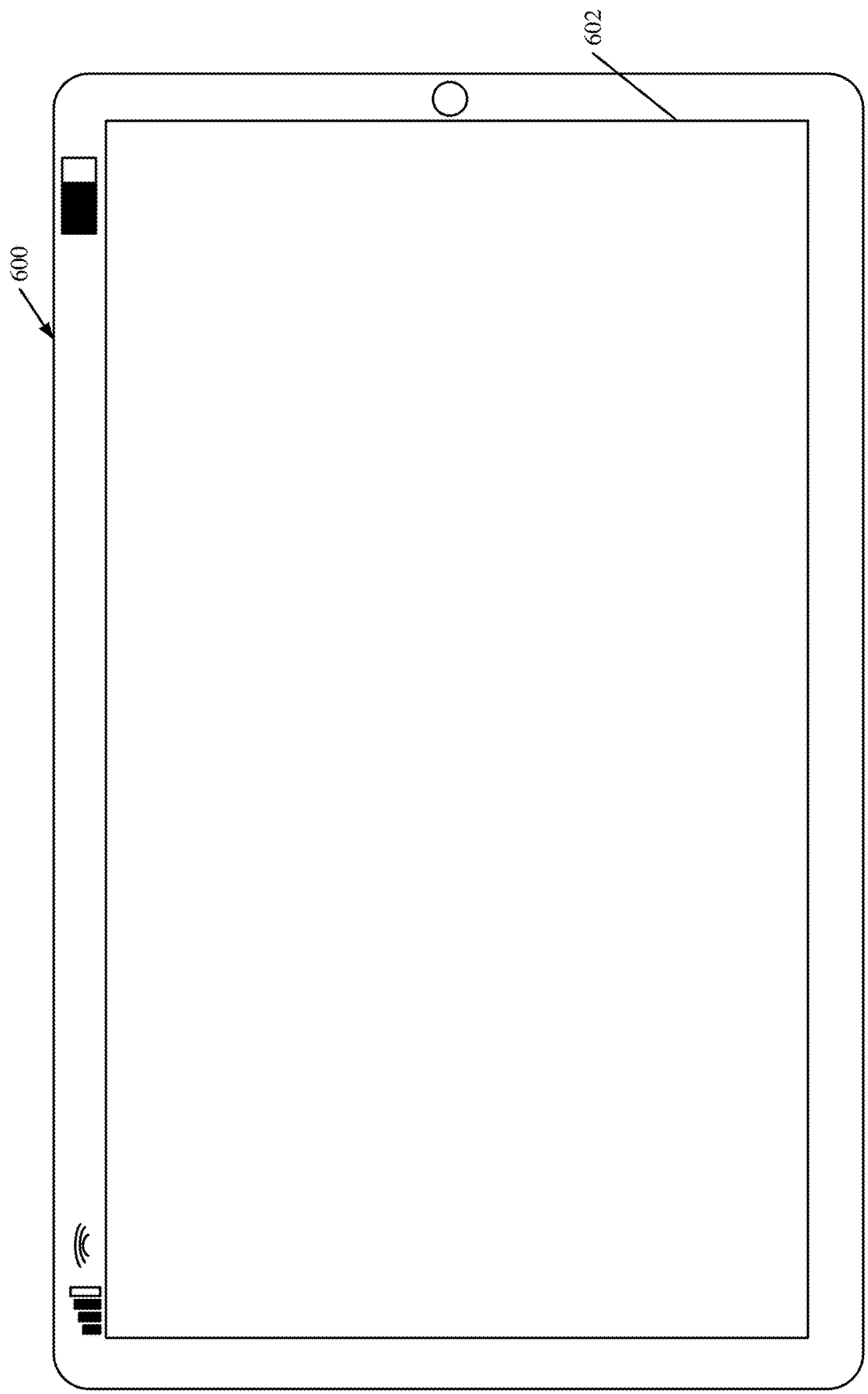
Figure 9:
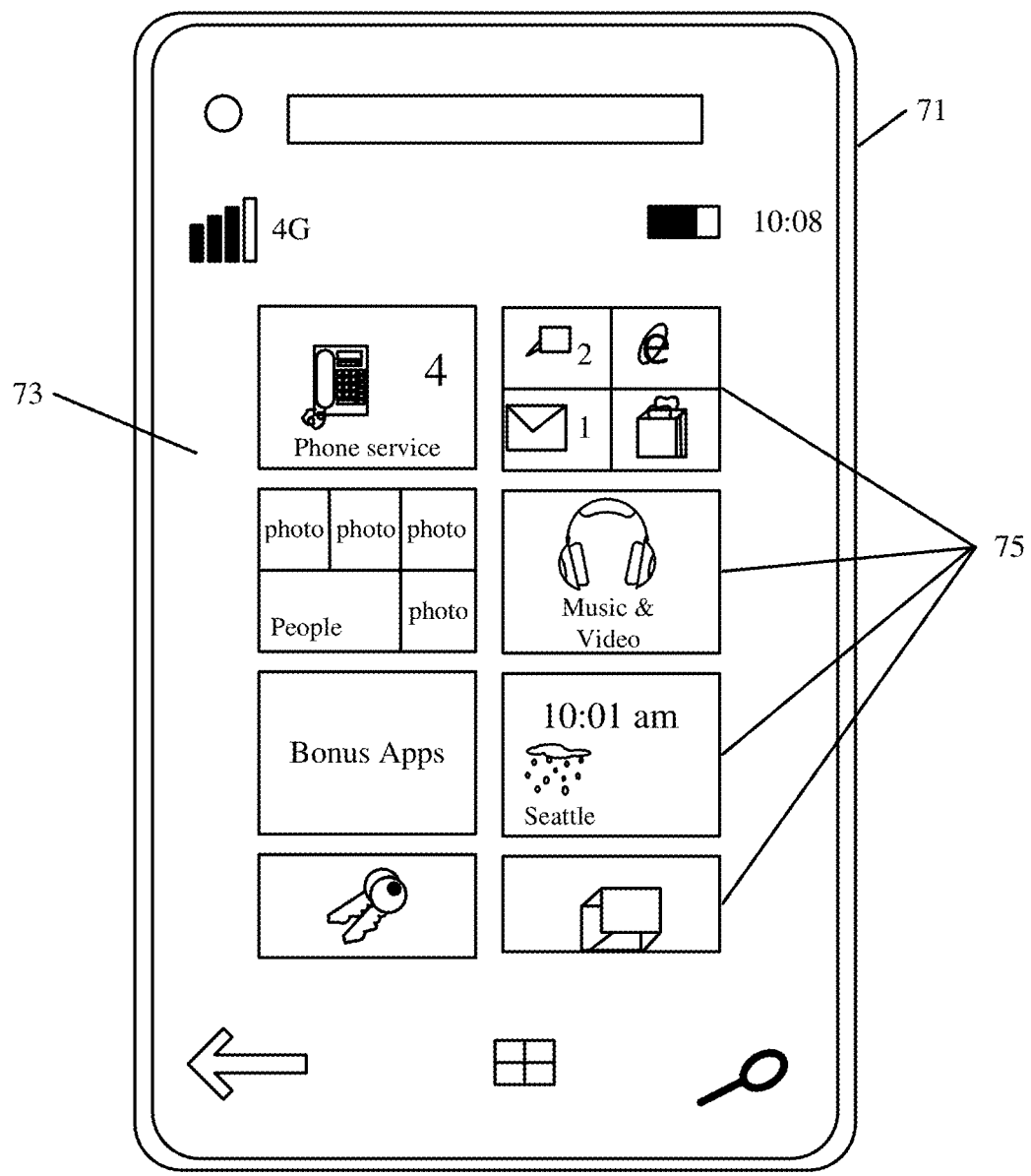

FIG. 7 is a simplified block diagram of one illustrative example of a handheld or mobile computing device that can be used as a user's or client's hand held device 16, in which the present system (or parts of it) can be deployed. For instance, a mobile device can be deployed in the operator compartment of tractor 106 for use in generating, processing, or displaying the yaw rate or meter control data. FIGS. 8-9 are examples of handheld or mobile devices.

FIG. 7 provides a general block diagram of the components of a client device 16 that can run some components shown in previous FIGS., that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from previous FIGS.) along a bus 19 that is also connected to memory 21 and input/output (I/O) components 23, as well as clock 25 and location system 27.

I/O components 23, in one example, are provided to facilitate input and output operations. I/O components 23 for various examples of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. System 27 can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. Memory 21 can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 8 shows one example in which device 16 is a tablet computer 600. In FIG. 8, computer 600 is shown with user interface display screen 602. Screen 602 can be a touch screen or a pen-enabled interface that receives inputs from a pen or stylus. Computer 600 can also use an on-screen virtual keyboard. Of course, computer 600 might also be attached to a keyboard or other user input device through a suitable attachment mechanism, such as a wireless link or USB port, for instance. Computer 600 can also illustratively receive voice inputs as well.

FIG. 9 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 10:
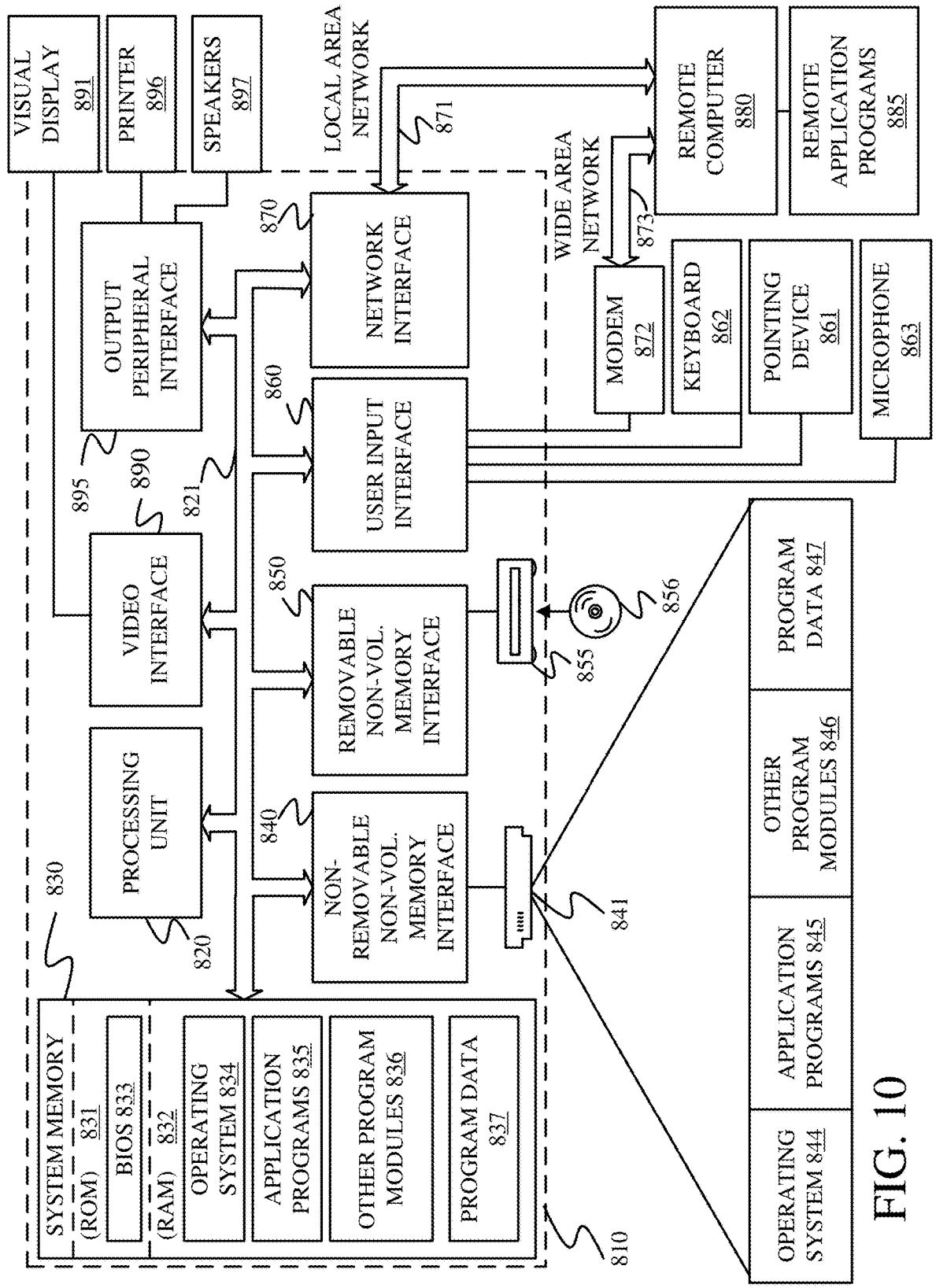
FIG. 10 is a block diagram of one example of a computing environment that can be used in the systems and architectures shown in the previous FIGS.

FIG. 10 is one example of a computing environment in which elements of previous FIGS., or parts of it, (for example) can be deployed. With reference to FIG. 10, an example system for implementing some embodiments includes a computing device in the form of a computer 810 programmed to operate as described above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 10 illustrates, for example, that remote application programs 885 can reside on remote computer 880.

It should also be noted that the different examples described herein can be combined in different ways. That is, parts of one or more examples can be combined with parts of one or more other examples. All of this is contemplated herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural system, comprising:
    an agricultural machine configured to deliver seed and material to a field;
    an acoustic/vibration sensor configured to sense sound or vibration generated by a component of the agricultural machine and to generate a sensor signal responsive to the sensed sound or vibration, wherein the sound or vibration generated by the component is responsive to operation of the agricultural machine, and wherein the component is different than the acoustic/vibration sensor;
    a signal processing system configured to identify a machine operation characteristic based on the sensor signal; and
    a control signal generator configured to generate a control signal to control the agricultural machine based on the identified characteristic.

2. The agricultural system of claim 1 wherein the signal processing system comprises:
    an artificial intelligence processing system.

3. The agricultural system of claim 1 wherein the signal processing system comprises:
    a convolutional neural network.

4. The agricultural system of claim 1 wherein the component comprises a seeding tool configured to apply the seed to the field, wherein the acoustic/vibration sensor is mounted relative to the seeding tool to sense sound or vibration generated by the seeding tool and wherein the signal processing system comprises:
    a machine characteristic processor configured to identify, as the machine operation characteristic, a characteristic of the seeding tool based on the sensor signal.

5. The agricultural system of claim 4 wherein the machine characteristic processor is configured to identify, as the characteristic of the seeding tool, a characteristic of the seeding tool indicative of whether a portion of the seeding tool is operating based on the sensor signal.

6. The agricultural system of claim 4 wherein the machine characteristic processor is configured to identify, as the characteristic of the seeding tool, a characteristic of the seeding tool indicative of a wear level of a portion of the seeding tool based on the sensor signal.

7. The agricultural system of claim 4 wherein the machine characteristic processor is configured to identify, as the characteristic of the seeding tool, a characteristic of the seeding tool indicative of whether a portion of the seeding tool is operating in a predefined way based on the sensor signal.

8. The agricultural system of claim 1 wherein the component comprises a material delivery system configured to deliver the material to the field, wherein the acoustic/vibration sensor is mounted relative to the material delivery system to sense sound or vibration generated by the material delivery system, and wherein the signal processing system comprises:
    a machine characteristic processor configured to identify, as the machine operation characteristic, a characteristic of the material delivery system based on the sensor signal.

9. The agricultural system of claim 1 wherein the component comprises a soil engaging element configured to engage soil in the field and wherein the acoustic/vibration sensor is mounted relative to the soil engaging element to sense sound or vibration generated by the soil engaging element.

10. The agricultural system of claim 9 wherein the signal processing system comprises:
a soil characteristic processor configured to identify, as the machine operation characteristic, a characteristic of soil engaged by the soil engaging element based on the sensor signal.

11. The agricultural system of claim 10 wherein the soil characteristic processor is configured to identify, as the characteristic of the soil engaged by the soil engaging element, a characteristic indicative of a level of residue engaged by the soil engaging element based on the sensor signal.

12. The agricultural system of claim 10 wherein the soil characteristic processor is configured to identify, as the characteristic of the soil engaged by the soil engaging element, a characteristic indicative of the soil engaging element striking a rock based on the sensor signal.

13. The agricultural system of claim 10 wherein the soil characteristic processor is configured to identify, as the characteristic of the soil engaged by the soil engaging element, a characteristic indicative of a type of soil engaged by the soil engaging element based on the sensor signal.

14. The agricultural system of claim 9 wherein the soil engaging element comprises a furrow opener configured to open a furrow in the field into which the material is delivered, wherein the acoustic/vibration sensor is mounted relative to the furrow opener to sense sound or vibration generated by the furrow opener, and wherein the signal processing system comprises:
a furrow characteristic processor configured to identify, as the machine operation characteristic, a characteristic of the furrow based on the sensor signal.

15. An agricultural system, comprising:
an agricultural machine including an application tool configured to perform an agricultural operation applying material to a field;
an acoustic/vibration sensor configured to sense noise or vibrations generated by operation of the application tool and to generate a sensor signal responsive to the sensed noise or vibrations;
a signal processing system configured to identify a characteristic based on the sensor signal; and
an output signal generator configured to generate an output signal based on the identified characteristic.

16. The agricultural system of claim 15 wherein the application tool comprises a seeding tool wherein the acoustic/vibration sensor is mounted relative to the seeding tool to sense sound or vibration generated by operation of the seeding tool and wherein the signal processing system comprises:
a machine characteristic processor configured to identify, as the characteristic, a characteristic of the seeding tool based on the sensor signal.

17. The agricultural system of claim 15 wherein the application tool comprises a soil engaging element configured to engage soil in the field and wherein the acoustic/vibration sensor is mounted relative to the soil engaging element to sense sound or vibration generated by operation of the soil engaging element and wherein the signal processing system comprises:
a soil characteristic processor configured to identify, as the characteristic, a characteristic of soil engaged by the soil engaging element based on the sensor signal.

18. A method, comprising:
applying material to a field with an agricultural machine;
sensing, with a sensor, a sound or vibration generated by a component of the agricultural machine, the component different than the sensor;
generating a sensor signal responsive to the sensed sound or the sensed vibration;
processing the sensor signal with a machine learning processing system to identify a characteristic based on the sensor signal; and
generating an output signal based on the identified characteristic.

19. The method of claim 18 wherein processing the sensor signal comprises:
processing the sensor signal to identify, as the characteristic, at least one of a machine characteristic of the agricultural machine, a furrow characteristic of a furrow opened by the agricultural machine, or a soil characteristic of soil in which the furrow is opened.

* * * * *